(12) United States Patent
Hinoue et al.

(10) Patent No.: US 6,879,710 B1
(45) Date of Patent: Apr. 12, 2005

(54) AUTHENTICATION APPARATUS USING A DISPLAY/FINGERPRINT READER

(75) Inventors: Sadahiko Hinoue, Nara (JP); Kouichi Harada, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/517,163

(22) Filed: Apr. 5, 2000

(30) Foreign Application Priority Data

Apr. 5, 1999 (JP) .......................................... P11-98138

(51) Int. Cl.$^7$ .............................................. G06K 9/20
(52) U.S. Cl. ...................... 382/124; 382/116; 340/5.53; 340/5.83; 345/175
(58) Field of Search .................................. 382/115, 116, 382/124; 340/5.52–5.54, 5.74–5.83, 5.86; 345/157, 163, 172–178; 707/511

(56) References Cited

U.S. PATENT DOCUMENTS

| | | | |
|---|---|---|---|
| 5,040,142 A | | 8/1991 | Mori et al. |
| 5,079,624 A | * | 1/1992 | Sasuga et al. ............... 358/530 |
| 5,086,385 A | * | 2/1992 | Launey et al. ................ 700/83 |

(Continued)

FOREIGN PATENT DOCUMENTS

| | | |
|---|---|---|
| JP | 7-220075 | 8/1995 |
| JP | 7-234837 A | 9/1995 |
| JP | 8-315143 | 11/1996 |
| JP | 9-186312 | 7/1997 |
| JP | 9-221950 A | 8/1997 |
| JP | 9-297847 A | 11/1997 |
| JP | 9-305770 A | 11/1997 |
| JP | 10-11509 A | 1/1998 |
| JP | 10-69324 | 3/1998 |
| JP | 10-154231 | 6/1998 |
| JP | 10-198453 A | 7/1998 |
| JP | 2000-207535 | 7/2000 |
| WO | WO 97 29477 | 8/1997 |

*Primary Examiner*—Jingge Wu
*Assistant Examiner*—Ryan J. Hesseltine
(74) *Attorney, Agent, or Firm*—Birch, Stewart, Kolasch & Birch, LLP

(57) ABSTRACT

An object of the present invention is to provide an information processing apparatus which is provided with a fingerprint verification function with a high security and a high operability. When a fingerprint is inputted from a fingerprint reading surface of a display/fingerprint reading unit, a fingerprint data sensing control unit reads fingerprint data and coordinate data, and stores the data into a storage unit. The fingerprint data is verified against fingerprint data previously registered and stored in a storage unit, to determine whether or not there is a matching fingerprint. In an information processing apparatus, a fingerprint verification function is thus implemented. Further, based on the coordinate data related to fingerprint input, the operation of the information processing apparatus is controlled. Accordingly, with such simple control as coordinate designation by touching the fingerprint reading surface with a finger at the time of fingerprint verification, the operation of the information processing apparatus can be controlled.

1 Claim, 24 Drawing Sheets

U.S. PATENT DOCUMENTS

| | | | |
|---|---|---|---|
| 5,420,936 A | | 5/1995 | Fitzpatrick et al. |
| 5,493,621 A | * | 2/1996 | Matsumura ................. 382/125 |
| 5,745,686 A | * | 4/1998 | Saito et al. .................. 717/168 |
| 5,748,184 A | * | 5/1998 | Shieh .......................... 345/173 |
| 5,768,386 A | * | 6/1998 | Yokomoto et al. ........... 713/183 |
| 5,838,306 A | | 11/1998 | O'Connor et al. |
| 5,850,219 A | | 12/1998 | Kumomura |
| 5,874,948 A | | 2/1999 | Shieh |
| 5,887,131 A | * | 3/1999 | Angelo ........................ 713/202 |
| 5,924,109 A | * | 7/1999 | Ackerman et al. ........... 707/531 |
| 5,948,103 A | | 9/1999 | Fukuzaki |
| 5,970,146 A | * | 10/1999 | McCall et al. ............... 713/194 |
| 5,978,477 A | * | 11/1999 | Hull et al. ................... 358/403 |
| 5,978,495 A | * | 11/1999 | Thomopoulos et al. ..... 382/124 |
| 5,990,803 A | * | 11/1999 | Park ........................... 340/5.53 |
| 6,035,406 A | * | 3/2000 | Moussa et al. .............. 713/202 |
| 6,078,848 A | * | 6/2000 | Bernstein et al. ........... 700/237 |
| 6,111,977 A | * | 8/2000 | Scott et al. .................. 382/124 |
| 6,144,756 A | * | 11/2000 | Takahashi et al. ........... 382/124 |
| 6,185,685 B1 | * | 2/2001 | Morgan et al. .............. 713/183 |
| 6,193,152 B1 | * | 2/2001 | Fernando et al. ............ 235/380 |
| 6,193,153 B1 | * | 2/2001 | Lambert ...................... 235/380 |
| 6,476,797 B1 | * | 11/2002 | Kurihara et al. ............. 345/173 |
| 6,543,684 B1 | * | 4/2003 | White et al. ................. 235/379 |

\* cited by examiner

FIG. 3

| NAME STORING SECTION 63 | BASIC DATA SECTION 61 | | POSITION /DEPUTY 65 | PERTINENT DATA SECTION 62 | | | AUTHORITY DATA STORING SECTION 69 | | | INITIATION APPLICATION SETTING STORING SECTION 70 |
|---|---|---|---|---|---|---|---|---|---|---|
| | FINGERPRINT DATA STORING SECTION 64 | | | CONTROL ENVIRONMENT STORING SECTION 66 | AVAILABLE FUNCTION RESTRICTION DATA STORING SECTION 67 | FINGER SHORT-CUT DATA STORING SECTION 68 | APPARATUS SETTING CHANGE LEVEL 69a | NETWORK CONNECTION CHANGE LEVEL 69b | OTHERS 69c | |
| | LEFT HAND FINGERS 64a | RIGHT HAND FINGERS 64b | | | | | | | | |
| ICHIRO SUZUKI | FINGERPRINT DATA | FINGERPRINT DATA | MANAGER/ OHNISHI | HELP: ALWAYS ON SCREEN KEY: ALWAYS ON LARGE LETTER | UNAVAILABLE SIO FIP CDROM | THUMB OF RIGHT HAND SCHEDULE REGISTRATION | LEVEL 1 | LEVEL 1 | | APPROVAL REQUEST |
| TARO YAMADA | FINGERPRINT DATA | FINGERPRINT DATA | STAFF/ NONE | LETTER REDUCED IN SIZE | UNAVAILABLE NONE | THUMB OF RIGHT HAND | LEVEL 3 | LEVEL 3 | SUPER USER SETTING | NETWORK CONNECTION |

F I G. 20
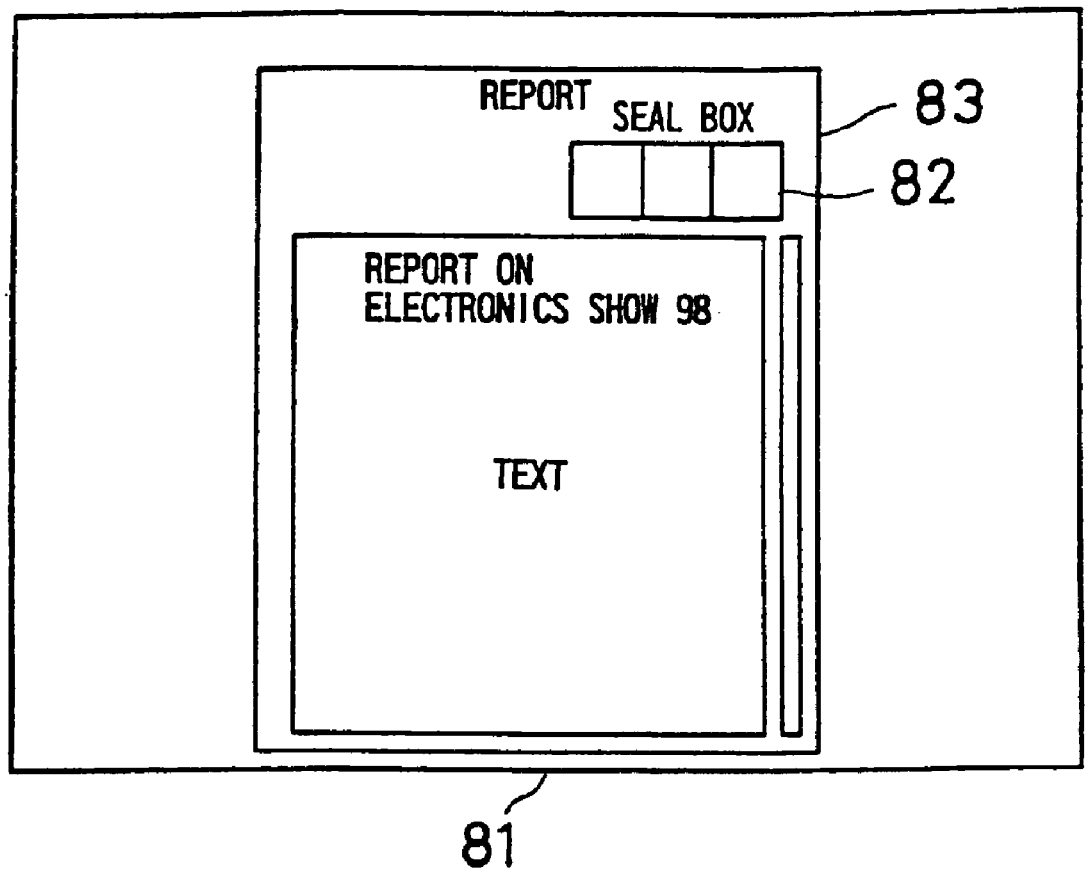

FIG. 22

REQUEST OF APPROVAL
FOR PURCHASING COMPONENTS

SEAL BOX — 85

PLEASE APPROVE PURCHASE OF COMPONENTS LISTED BELOW

TOTAL AMOUNT   XXXXX YEN

REASON FOR PURCHASE
TO DEVELOP NEW PRODUCT

| NAME OF COMPONENT | NUMBER | UNIT PRICE | AMOUNT |
|---|---|---|---|
| COMPONENT A | 3 | 500 | 1500 |
| COMPONENT B | 4 | 1000 | 4000 |
| COMPONENT C | 1 | 8000 | 8000 |

F I G. 23
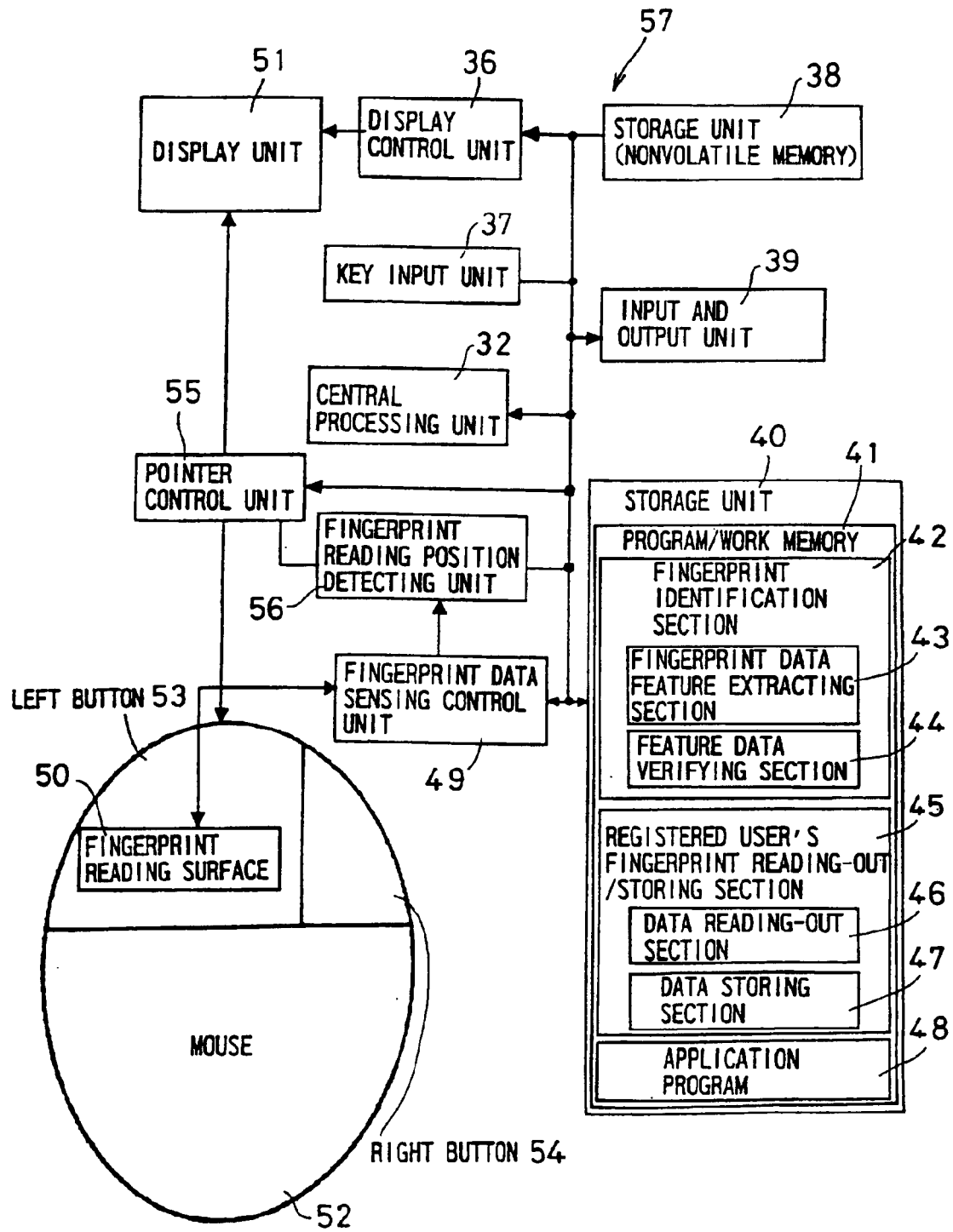

AUTHENTICATION APPARATUS USING A DISPLAY/FINGERPRINT READER

BACKGROUND OF THE INVENTION

1. Field of the Invention

The present invention relates to an information processing apparatus which is provided with a fingerprint verification function.

2. Description of the Related Art

Owing to the development of network society, the fusion of information processing apparatuses and networks has progressed and the necessity of security functions such as individual verification has increased. With respect to individual verification, attention is being given to authentication by living body information such as a fingerprint, which makes an information processing apparatus hard to be abused by others and cannot be lost unlike keys or IC (integrated circuit) cards. With respect to systems of reading a fingerprint, one that uses optics such as a prism is dominant, which is disclosed, for example, in Japanese Unexamined Patent Publication JP-A 8-315143 (1996). On the other hand, another technique is disclosed in Japanese Unexamined Patent Publication JP-A 9-186312 (1997) in which a photodiode is placed to be adjacent to a TFT (thin-film transistor) element of a liquid crystal display device so as to work as a CCD (charge-coupled device) to read out an image. Moreover, still another technique is disclosed in Japanese Unexamined Patent Publications JP-A 7-220075 (1995) and JP-A 10-154231 (1998) which technique relates to a system of identifying individuals by fingerprints. In addition, yet another technique which relates to control of the operation of an information processing apparatus based on a fingerprint verification result is disclosed in Japanese Unexamined Patent Publication JP-A 10-69324 (1998).

FIG. 24 is a block diagram of a prior art information processing apparatus 1 which is provided with a fingerprint verification function. Moreover, FIGS. 25A and 25B are views showing a fingerprint reading unit 4 and a display unit 7 which are comprised by the information processing apparatus 1. To a central processing unit 2 of the information processing apparatus 1, a fingerprint data sensing control unit 3 for controlling the fingerprint reading unit 4, a key input unit 5 such as a keyboard, a display control unit 6 for controlling the display unit 7 such as a liquid crystal display device, a storage unit 8 implemented by a nonvolatile memory, an input/output unit 9 used for connection to a network and connection to a peripheral equipment such as a printer, and a storage unit 10 are connected, whereby the operation of the overall apparatus is integrally controlled.

A user's registered data is stored in the storage unit 8, and when being required, is read out and transferred to the storage unit 10 to be stored therein by the central processing unit 2. Although an application program is also stored in the storage unit 8, and when being required, is read out and transferred to the storage unit 10 to be stored therein by the central processing unit 2, the program may be previously stored in the storage unit 10.

The fingerprint reading unit 4 is implemented by the system in which optics disclosed in JP-A 8-315143 and the technique disclosed in JP-A 9-186312 as mentioned above. A fingerprint read by the fingerprint reading unit 4 is temporarily stored in a fingerprint data storage section 21 of the fingerprint data sensing control unit 3, and thereafter supplied to the storage unit 10.

The storage unit 10 includes a program work memory 11 which is composed of a fingerprint verification section 12 including a fingerprint data feature extracting section 13 and a feature data verifying section 14, a registered user's fingerprint reading-out/storing section 15 including a data reading-out section 16 and a data storing section 17, and an application program storing section 18.

In the prior art information processing apparatus 1, as shown in FIG. 25A, the fingerprint reading unit 4 and a display screen 19 of the display unit 7 are separately disposed. Otherwise, as shown in FIG. 25B, a fingerprint reading screen 20 of the fingerprint reading unit 4 and the display screen 19 of the display unit 7 are separately disposed. Therefore, control of the operation of the information processing apparatus 1 by using coordinates related to fingerprint reading is not performed.

SUMMARY OF THE INVENTION

An object of the present invention is to provide an information processing apparatus which is provided with a fingerprint verification function with high security and operability.

The invention provides an information processing apparatus comprising fingerprint verification means for verifying a fingerprint read from a fingerprint reading surface against previously stored fingerprints of authorized users, the information processing apparatus comprising:

display means having a display surface with orthogonal coordinates set thereon;

coordinate designating means for designating coordinates related to fingerprint reading on the display surface; and control means for controlling an operation based on designated coordinates.

According to the invention, a fingerprint read from the fingerprint reading surface is verified against previously stored fingerprints and whether or not there is a match is determined. In the information processing apparatus, a fingerprint verification function is thus implemented. Further, at the time of fingerprint verification, coordinates related to fingerprint reading on the display surface of the display means are designated by the coordinate designating means. The control means controls the operation of the information processing apparatus based on designated coordinates. Accordingly, with such simple control as coordinate designation at the time of fingerprint verification, the operation of the information processing apparatus can be controlled.

Further, in the information processing apparatus of the invention it is preferable that the display surface and the fingerprint reading surface are one and the same.

According to the invention, at the time of fingerprint verification, a finger of the user touches the display surface serving as the fingerprint reading surface, whereby a fingerprint read from the fingerprint reading surface is compared for authentication. Moreover, coordinates related to fingerprint reading on the display surface, that is, coordinates of a position touched with a finger are designated at the time of the touch. The control means controls the operation of the information processing apparatus based on the coordinates designated with such simple control. Since the display surface and the fingerprint reading surface are one and the same, fingerprint input and coordinate designation can be performed with one and the same operation with the result that high operability can be attained.

Still further, in the information processing apparatus of the invention it is preferable that the fingerprint reading surface is formed on the coordinate designating means.

According to the invention, fingerprint verification is carried out in such a manner that a finger of the user touches the fingerprint reading surface formed on the coordinate designating means, to verify a fingerprint read from the fingerprint reading surface. Moreover, coordinates related to fingerprint reading on the display surface are designated by the coordinate designating means. The control means controls the operation of the information processing apparatus based on the coordinates designated with such simple control. Since the fingerprint reading surface is formed on the coordinate designating means, coordinate designation and fingerprint input can be performed with one and the same operation, with the result that high operability can be attained.

Still further, in the information processing apparatus of the invention it is preferable that the control means activates the fingerprint verification means when specific coordinates are designated.

According to the invention, the operation of the information processing apparatus can be controlled so as to activate the fingerprint verification means when designated coordinates are specific ones. Accordingly the information processing apparatus is controlled so as not to perform fingerprint verification when coordinates other than the specific ones are designated, that is, so as to perform fingerprint verification only when the specific coordinates are designated, with a result that high security can be attained.

Still further, the information processing apparatus of the invention further comprises:

secret number acquiring means for acquiring a secret number based on designated coordinates; and secret number identifying means for verifying the acquired secret number against a previously stored secret number to identify the acquired secret number, wherein the control means controls an operation based on a result of the secret number verification.

According to the invention, a fingerprint verification function is implemented in such a manner as mentioned above. Moreover, coordinates related to fingerprint reading on the display surface of the display means are designated by the coordinate designating means, and a secret number based on the designated coordinates is acquired by the secret number acquiring means. The acquired secret number is verified against a previously stored secret number to determine whether the secret numbers match each other or not. In the information processing apparatus, the secret number verification function is thus implemented. The controlling means controls the operation of the information processing apparatus based on the result of secret number verification. Accordingly, with the simple operation of coordinate designation for inputting a secret number at the time of fingerprint verification, the operation of the information processing apparatus can be controlled.

Still further, in the information processing apparatus of the invention it is preferable that the control means activates the fingerprint verification means when the secret numbers match each other.

According to the invention, the operation of the information processing apparatus can be controlled so as to activate the fingerprint verification means when an acquired secret number matches a previously stored secret number. Therefore, by controlling so as not to perform fingerprint verification when a number other than a specific secret number is acquired, that is, by controlling so as to perform fingerprint verification only when the secret numbers match, high security can be attained.

Still further, in the information processing apparatus of the invention it is preferable that the control means controls the operation of a power source of the information processing apparatus when there is a match in fingerprint.

According to the invention, when there is a match as a result of the verification of the read fingerprint against previously stored fingerprints, the on/off operation of the power source of the information processing apparatus is controlled. For example, when the fingerprints match, the power source is switched from the off state to the on state. Thus, high security and operability can be attained and power consumption can be reduced.

Still further, in the information processing apparatus of the invention it is preferable that when there is a match as a result of the verification of the read fingerprint against the previously stored fingerprints, the control means reads out an operation condition associated with an authorized user having the matching fingerprint from among operation conditions previously set for the authorized users and sets the condition.

According to the invention, when as a result of the fingerprint verification, a read fingerprint is found to match one of previously stored fingerprints, an operation condition associated with the user having the matching fingerprint is read out from among operation conditions previously set for the respective users and the operation condition is set. Therefore, a control environment and available functions suitable for the respective authorized users can be set with the result that high operability can be attained.

Still further, in the information processing apparatus of the invention it is preferable that the fingerprint verification means is capable of verifying fingerprints of all fingers of both hands.

According to the invention, fingerprints of all fingers of both hands can be identified in the fingerprint verification function, so that the operation of the information processing apparatus can be exactly controlled based on the result of fingerprint verification of each finger.

Still further, in the information processing apparatus of the invention it is preferable that when the fingerprints of the respective fingers match the previously stored ones, the control means reads out a command associated with each finger of the user having the matching fingerprints, from among commands previously registered for the respective fingers of the authorized user and executes the commands.

According to the invention, in the fingerprint verification function capable of identifying the fingerprint of each finger, when the fingerprint of each finger matches a previously stored fingerprint of each finger, a command associated with each finger of the user having the matching fingerprint among commands previously registered for each finger of the authorized users is read out and executed. Accordingly, high security and operability can be attained, and moreover, the operation can be exactly controlled for each finger.

Still further, the information processing apparatus according to the invention further comprises:

icon setting means for setting an icon associated with an application; and icon designation judging means for judging whether the set icon is designated or not, based on designated coordinates, wherein when the icon is designated and there is a match in fingerprint as a result of the fingerprint verification, the control means reads out only data of a user having the matching fingerprint in an application associated with the designated icon and causes the data to be displayed.

According to the invention, the fingerprint verification function is implemented in such a manner as mentioned above. Moreover, coordinates related to the reading of a fingerprint on the display surface of the display means are designated by the coordinate designating means. The icon designation judging means judges based on the designated coordinates whether the icon set by the icon setting means is designated or not. The control means controls the operation of the information processing apparatus based on the result of this judgment and the result of fingerprint verification. That is to say, when the icon is designated and fingerprints match, only data of the user having the matching fingerprint in an application associated with the designated icon is read out and displayed. In this way, with such simple control as coordinate designation at the time of fingerprint verification, the operation of the information processing apparatus can be controlled.

Still further, in the information processing apparatus of the invention it is preferable that when an icon is designated and there is a match in fingerprint as a result of the fingerprint verification, the control means initiates an application associated with a user having the matching fingerprint among applications previously set for the respective authorized users.

According to the invention, the control means controls the operation of the information processing apparatus based on the result of icon designation judgement and the result of fingerprint verification. That is to say, when an icon is designated and there is a match in fingerprint as a result of the fingerprint verification, an application associated with the user having the matching fingerprint among applications previously set for the respective users is initiated. In this way, with such simple control as coordinate designation at the time of fingerprint verification, the operation of the information processing apparatus can be controlled.

Still further, in the information processing of the invention it is preferable that:

the respective icons are associated with files for the respective authorized users; and when an icon is designated and there is a match in fingerprint as a result of the fingerprint verification, the control means opens only a file of a user having the matching fingerprint out of files associated with the designated icon out of the files.

According to the invention, the control means controls the operation of the information processing apparatus based on a result of the icon designation judgement and a result of the fingerprint verification. That is to say, when an icon is designated and there is a match in fingerprint, only a file of an authorized user having the matching fingerprint is opened which is one out of files associated with the designated icon among the files. In this way, with such simple control as coordinate designation at the time of fingerprint verification, the operation of the information processing apparatus can be controlled.

Still further, the information processing apparatus according to the invention further comprises:

menu execution level area setting means for setting an area associated with an execution level of a menu; and menu execution level area designation judging means for judging based on designated coordinates whether a set menu execution level area is designated or not, wherein when a menu execution level area is designated and there is a match in fingerprint, the control means executes a menu at an execution level associated with an authorized user having the matching fingerprint among execution levels previously set for the respective users, as well as an execution level of the designated menu execution level area.

According to the invention, the fingerprint verification function is implemented in such a manner as mentioned above. Moreover, coordinates related to fingerprint reading on the display surface of the display means are designated by the coordinate designating means. The menu execution level area designation judging means judges based on designated coordinates whether a menu execution level area set by the menu execution level area setting means is designated or not. The control means controls the operation of the information processing apparatus based on the result of this judgment and the result of fingerprint verification. That is to say, when a menu execution level area is designated and there is a match in fingerprint, a menu is executed at an execution level associated with the user having the matching fingerprint among execution levels previously set for the respective users, as well as an execution level of the designated menu execution level area. In this way, with such simple control as coordinate designation at the time of fingerprint verification, the operation of the information processing apparatus can be controlled.

Still further, in the information processing apparatus of the invention it is preferable that:

a document having a seal box is displayed on the display means; and when detected coordinates are coordinates of the seal box, the control means affixes an approval seal in the seal box of the document, the information processing apparatus further comprising:

communication means for communicating an approval-seal affixed document.

According to the invention, with respect to a document having a seal box, when coordinates designated in relation to fingerprint reading are coordinates within the seal box, an approval seal is affixed. In addition, an approval-seal affixed document is communicated by the communication means. Therefore, a document such as a report can be transferred to the next person and circulated.

Still further, in the information processing apparatus of the invention it is preferable that:

a document having a seal box is displayed on the display means; and when detected coordinates are coordinates of the seal box, the control means affixes an approval seal in the seal box of the document, the information processing apparatus further comprising:

attendant processing means for subjecting an approval-seal affixed document to an attendant processing.

According to the invention, with respect to a document having a seal box, when coordinates designated in relation to fingerprint reading are coordinates within the seal box, an approval seal is affixed on the document. In addition, the approval-seal affixed document is subjected to an attendant processing by the attendant processing means. Therefore, for a document such as an approval request, a process of issuing an order form can be performed.

BRIEF DESCRIPTION OF THE DRAWINGS

Other and further objects, features, and advantages of the invention will be more explicit from the following detailed description taken with reference to the drawings wherein:

FIG. 3 is a view showing registered data of the users in a storage unit 38;

FIG. 20 is a view showing a screen 81, which includes a report 83;

FIG. 22 is a view showing a screen 84, which includes a approval request 86;

FIG. 23 is a block diagram of an information processing apparatus 57, which is another embodiment of the invention;

DETAILED DESCRIPTION OF THE PREFERRED EMBODIMENTS

Figure 1:
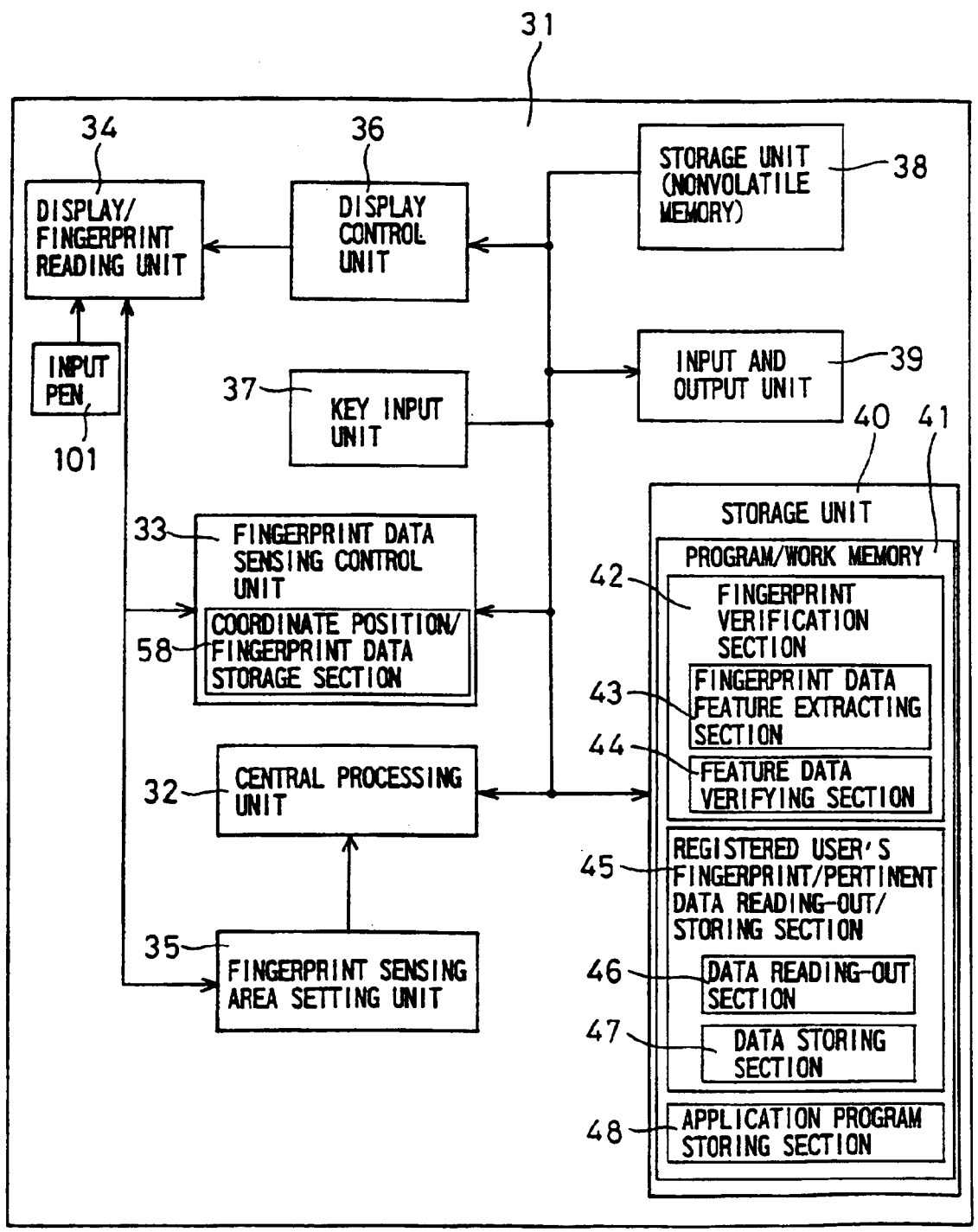
FIG. 1 is a block diagram of an information processing apparatus 31, which is an embodiment of the present invention.

Now referring to the drawings, preferred embodiments of the invention are described below.

FIG. 1 is a block diagram of an information processing apparatus 31, which is an embodiment of the present invention. To a central processing unit 32 of the information processing apparatus 31 provided with a fingerprint verification function, a fingerprint data sensing control unit 33 which controls a fingerprint reading operation of a display/fingerprint reading unit 34, a fingerprint sensing area setting unit 35, a display control unit 36 which controls a display operation of the display/fingerprint reading unit 34, a key input unit 37 such as a keyboard, a storage unit 38 implemented by a nonvolatile memory, an input and output unit 39 for connection to a network and connection to a peripheral equipment such as a printer, and a storage unit 40 are connected, whereby the operation of the overall apparatus is integrally controlled.

Figure 2:
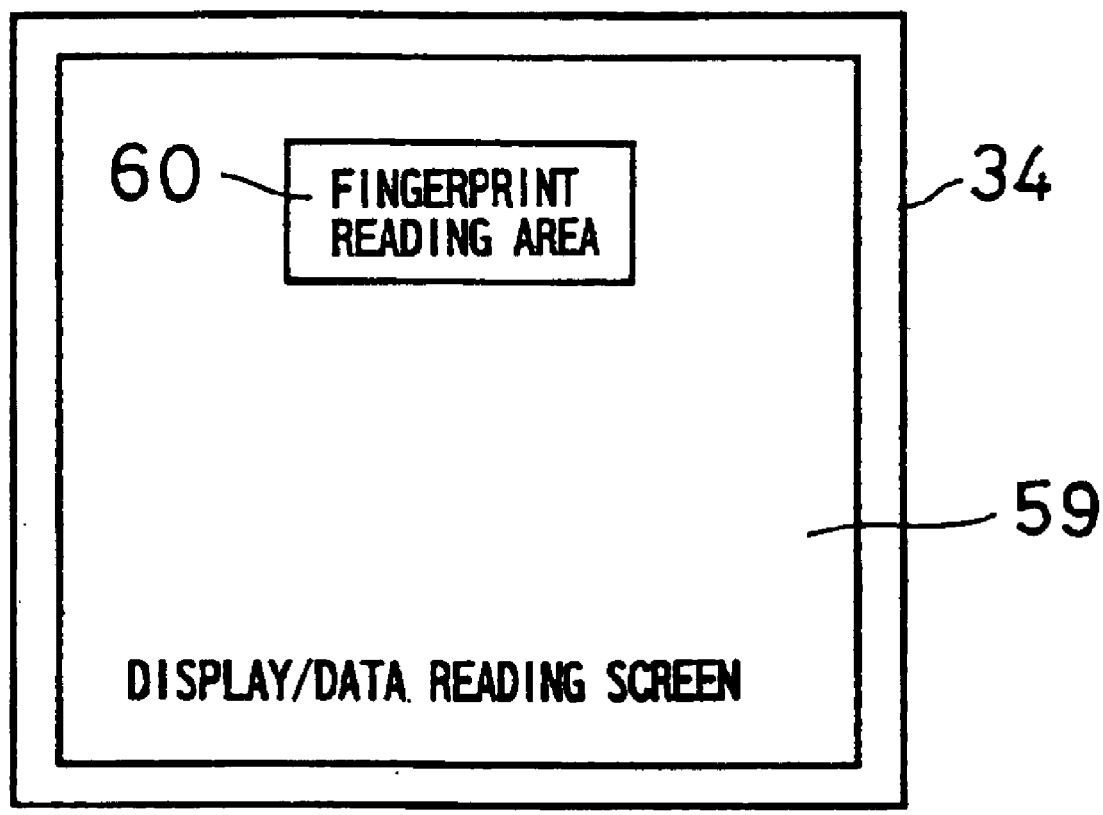
FIG. 2 is a view showing a display/data reading screen 59 of a display/fingerprint reading unit 34.

In the display/fingerprint reading unit 34, a display surface with orthogonal coordinates set thereon of a display unit implemented by, for example, a liquid crystal display device is identical to a fingerprint reading surface touched with a finger of a fingerprint reading unit implemented by a well-known technique. To be more specific, sensors for reading data are disposed to all the pixels of the liquid crystal display device. The sensors do not need to be disposed to all the pixels of the liquid crystal display device, and may be disposed to some of the pixels. Thus, by the display/fingerprint reading unit 34 including a display/data reading screen 59 shown in FIG. 2, coordinate data and fingerprint data on the screen 59 are acquired. The central processing unit 32 controls the operation of the information processing apparatus 31 based on the acquired coordinate data, and controls the operation of the apparatus 31 based on the acquired fingerprint data.

As the display/fingerprint reading unit 34, an image reading apparatus disclosed in Japanese Patent Application No. 11-12231 (1999) by the applicant of this application, that is, an image reading apparatus which has a light-receiving element embedded in a liquid crystal layer thereof to read fingerprint data may be adopted, for example. In the information processing apparatus 31, fingerprint reading means, display means and coordinate designating means are implemented by the display/fingerprint reading unit 34.

In a coordinate position/fingerprint data storage section 58 of the fingerprint data sensing control unit 33, coordinate data and fingerprint data acquired by the display/fingerprint reading unit 34 are temporarily stored. These stored data are transferred to the storage unit 40. To the display/fingerprint reading unit 34, display data are supplied from the display control unit 36. Further, the timing between a display operation and a fingerprint reading operation by the display/fingerprint reading unit 34 is controlled by the central processing unit 32.

The fingerprint sensing area setting unit 35 sets a fingerprint reading area 60 in the screen 59. The area 60 is a rectangular area in which coordinates of two points designated by designating means such as an input pen 101 are regarded as facing vertexes, for example. From the key input unit 37, additional data and the like with respect to fingerprint data are inputted as required.

User's registered data having been previously registered are stored in the storage unit 38, and read out and transferred to the storage unit 40 to be stored therein by the central processing unit 32 when required. Here, although an application program is also stored in the storage unit 38 in a like manner, and read out and transferred to the storage unit 40 to be stored therein by the central processing unit 32 when required, the program may be previously stored in the storage unit 40.

The storage unit 40 includes a program/work memory 41 which is composed of a fingerprint verification section 42, a user's registered data reading-out/storing section 45, and an application program storing section 48. The fingerprint verification section 42 includes a feature extracting section 43 which extracts feature data of fingerprint data and a verifying section 44 which verifies extracted feature data. The user's registered data reading-out/storing section 45 includes a data reading-out section 46 which reads out user's registered data and a data storing section 47 which stores user's registered data having been read out.

FIG. 3 is a view showing user's registered data in the storage unit 38. The user's registered data include a basic data section 61 and a pertinent data section 62 for the respective users. The basic data section 61 is composed of a user name data storing section 63, a fingerprint data storing section 64 and a managerial position/acting decider data storing section 65. In the fingerprint data storing section 64, fingerprint data 64a of each finger of a left hand and fingerprint data 64b of each finger of a right hand are stored, respectively. The pertinent data section 62 is composed of a control environment data storing section 66, an available function restriction data storing section 67, an each finger's shortcut data storing section 68, an authority data storing section 69 and an initiation application setting data storing section 70. In the authority data storing section 69, an apparatus setting change level 69a, a network connection change level 69b and other data 69c are stored, respectively.

Control environments correspond to the operation conditions of the information processing apparatus 31, which are, for example, data for defining display/non-display of specific information such as help information for giving a control guidance, on/off of a specific key such as a screen key, the size of a displayed letter and the like. The available function restriction data also correspond to the operation conditions, which are, for example, data for defining capability/incapability of reading out data from a connected CD (compact disc)—ROM (read only memory), capability/incapability of using SIO (a file transfer protocol) and the like. Each finger's shortcut data corresponds to a command previously set for each finger of the user, for example, a command for designating execution of a function of registering a schedule. The authority data are data for defining the apparatus setting change level, the network connection change level and the like. The initiation applications are an application for issuing an order form when a seal is affixed on a approval request and an application for network connection executed when a seal is affixed on a report.

Figure 4:
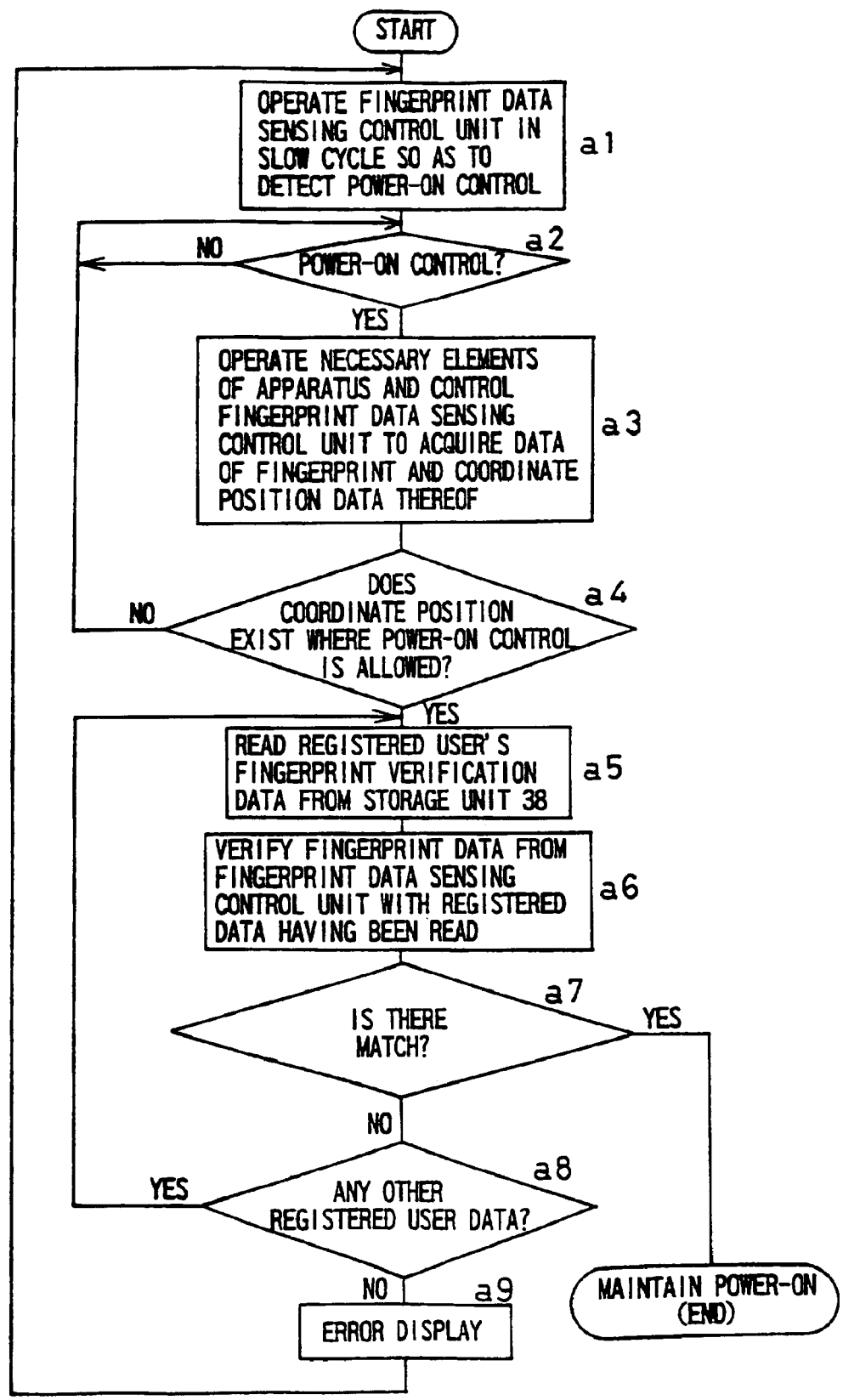
FIG. 4 is a flow chart showing a first operation of the information processing apparatus 31.

FIG. 4 is a flow chart showing a first operation of the information processing apparatus 31. At step a1, elements which are required for reading a fingerprint, that is, the central processing unit 32, the fingerprint data sensing control unit 33 and the display/fingerprint reading unit 34 are kept in the power-on state, elements which are not required for reading a fingerprint are kept in the power-off state, and fingerprint input is waited in a detection cycle of relatively slow fingerprint input. Until a fingerprint is inputted, these states are maintained, whereby power consumption is reduced.

At the following step a2, the central processing unit 32 judges whether power-on control by touching the display/data reading screen 59 of the display/fingerprint reading unit 34 with a finger has been done or not. When the unit judges that power-on control by touching with a finger has been done, the operation goes to the following step a3. When a finger touches, the fingerprint data sensing control unit 33 generates an interrupt signal toward the central processing unit 32. On the basis of this interrupt signal, the central processing unit 32 judges that power-on control has been done. Otherwise, by reading out a status by polling from the central processing unit 32 to the fingerprint data sensing control unit 33, the central processing unit 32 judges that power-on control has been done.

At step a3, where the overall information processing apparatus 31 is kept in the power-on state, the fingerprint data sensing control unit 33 reads out fingerprint data and coordinate data of a position touched with a finger from the display/fingerprint reading unit 34 and temporarily stores the data in the storage section 58. These data are transferred to the storage unit 40 via the central processing unit 32. Otherwise, the data are directly transferred to the storage unit 40 with DMA (direct memory access), not via the central processing unit 32.

At the following step a4, the central processing unit 32 judges whether a position according to the acquired coordinate data is a specific position or not. The operation goes to step a5 when the position is a specific position, whereas the operation goes back to step a2 when the position is not a specific position.

At step a5, the central processing unit 32 reads out fingerprint data of user's registered data registered in the storage unit 38 and stores the data into the storage unit 40. At the following step a6, the central processing unit 32 verifies the acquired fingerprint data against the fingerprint data read out from the storage unit 38 to identify the data. At the following step a7, the unit judges whether the fingerprints match or not. When the fingerprints match, the power-on state is kept and the operation is ended. When the fingerprints do not match, the operation goes to step a8.

At step a8, it is judged whether or not any other fingerprint data are registered in the storage unit 38, and when registered, the operation goes back to step a5 to repeat a fingerprint verification operation on all of the other registered fingerprint data. When any other fingerprint data are not registered, the operation goes to step a9 to perform error display and then goes back to step a1.

A fingerprint verification program stored in the storage unit 40 is the one read out from the storage unit 38 and stored therein. The program does not need to be read out and stored at every fingerprint verification, and the program read out and stored at the beginning may be used repeatedly.

Further, although fingerprint data registered in the storage unit 38 are read out and stored in the storage unit 40 at every verification in this embodiment, all of the registered fingerprint data may be read out at the beginning.

Furthermore, error display at step a9 can be performed as required, and the operation may immediately go to step a1 when it is found at step a8 that any other fingerprint data are not registered.

Figure 5:
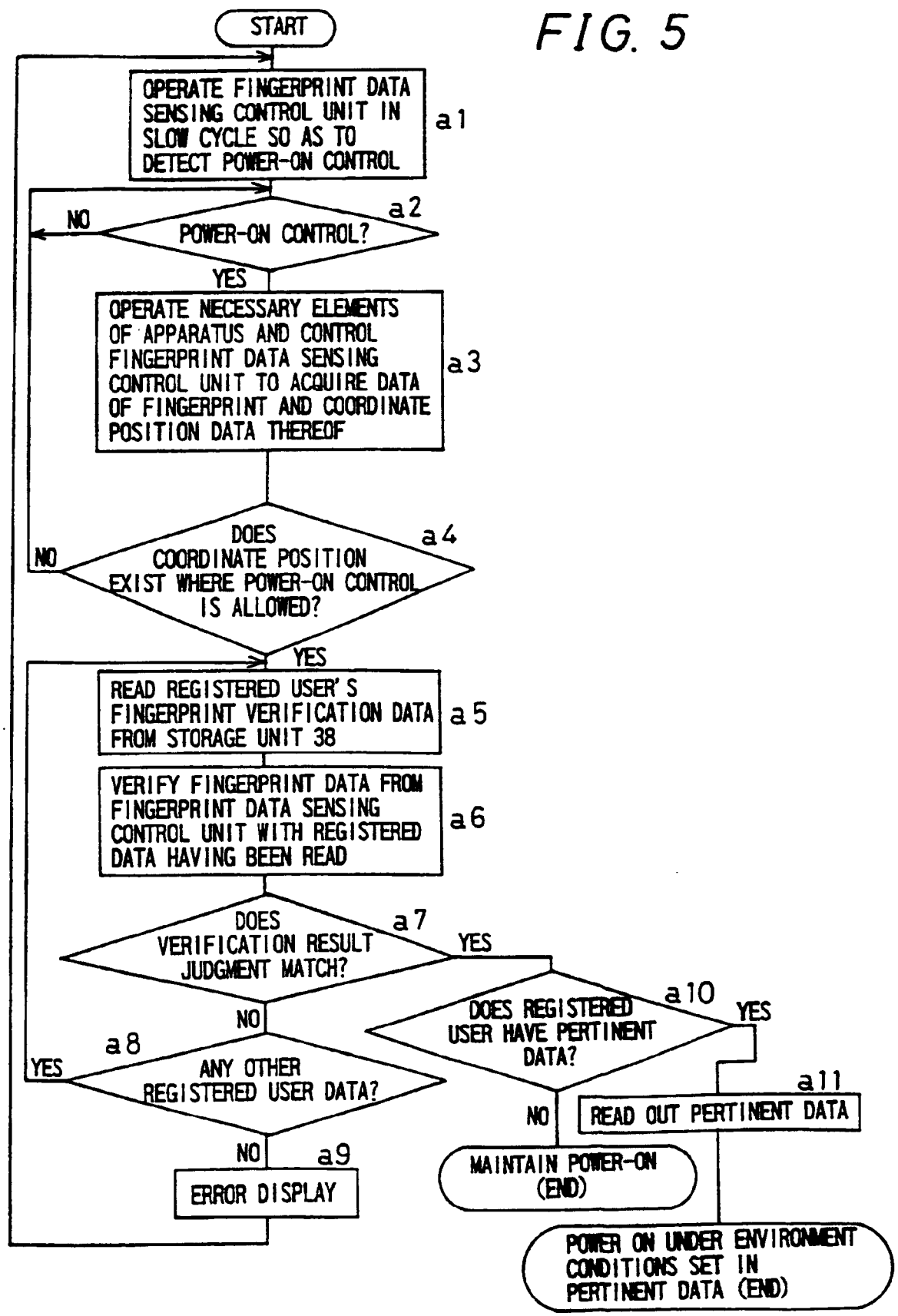
FIG. 5 is a flow chart showing a second operation of the information processing apparatus 31.

FIG. 5 is a flow chart showing a second operation of the information processing apparatus 31. This flow chart is the one that steps a10 and all are added to the flow chart of FIG. 4, so that explanation of like steps will be omitted. At step a7, it is judged whether the fingerprints match or not, and when the fingerprints match, the operation goes to step a10. At step a10, it is judged whether or not pertinent data associated with the user having the matching fingerprint exist in pertinent data registered in the storage unit 38. When the pertinent data exist, the operation goes to step a11 to read out the pertinent data. Then, control environments and available functions based on the pertinent data are set, the power-on state is maintained and the operation is ended. When the pertinent data do not exist, the power-on state is maintained in the present state and the operation is ended.

Figure 6:
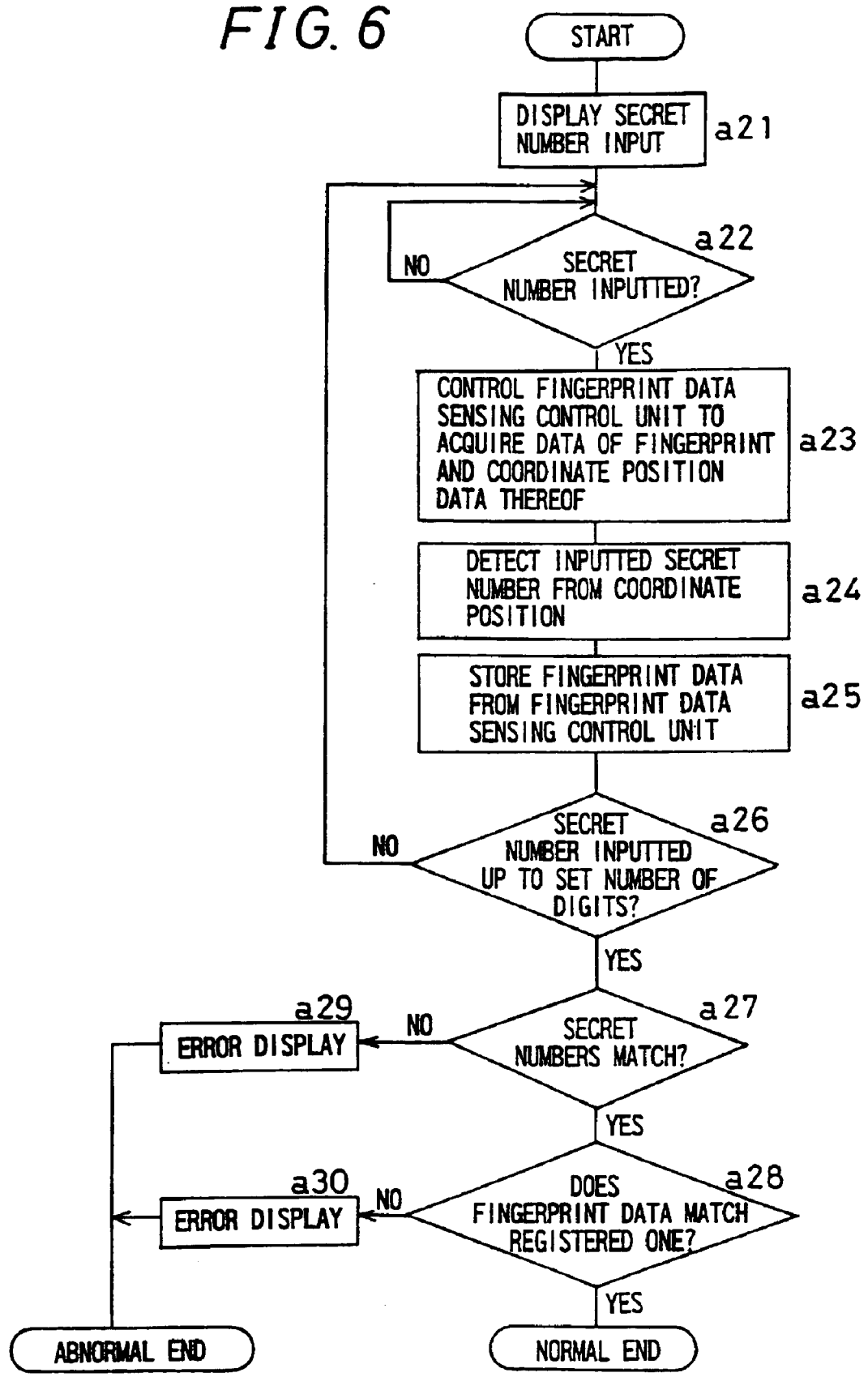
FIG. 6 is a flow chart showing a third operation of the information processing apparatus 31.
Figure 7:
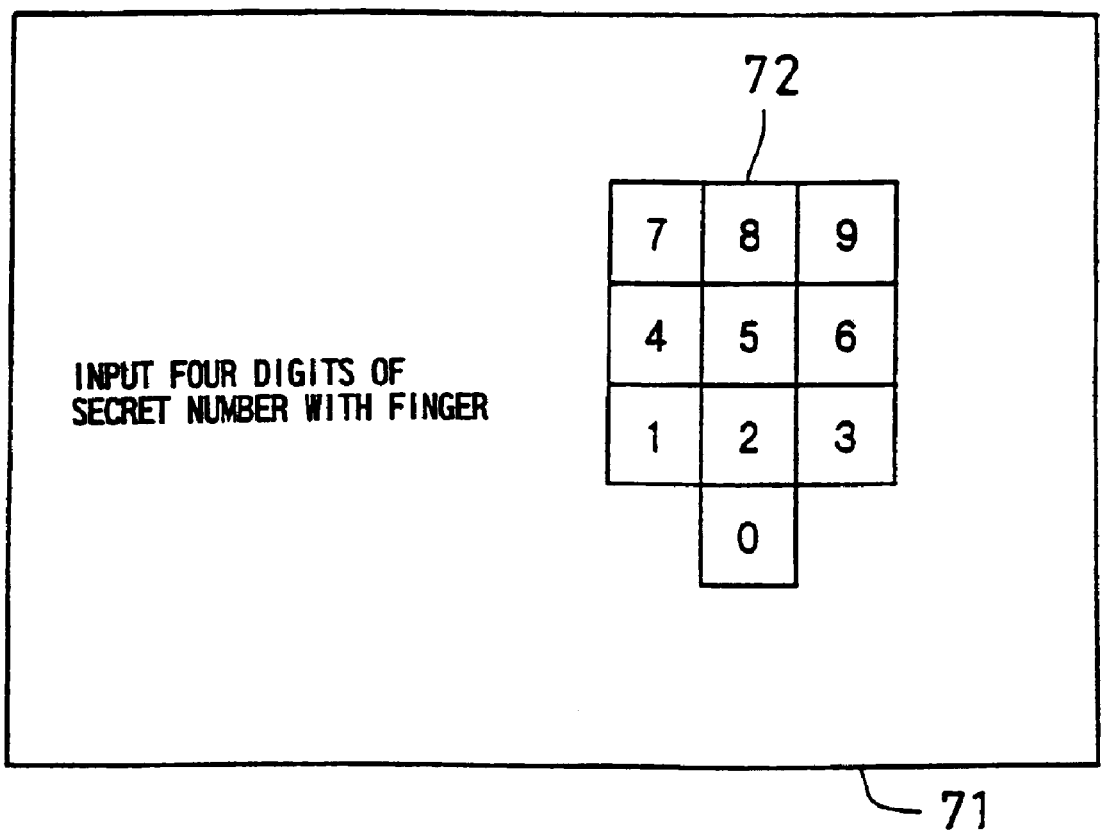
FIG. 7 is a view showing a screen 71, which encourages input of a secret number.

FIG. 6 is a flow chart showing a third operation of the information processing apparatus 31. At step a21, such a screen 71 encouraging input of a secret number as shown in FIG. 7 is set and displayed on the display/data reading screen 59 of the display/fingerprint reading unit 34. On the screen 71, a secret number input area 72 for designating numerical values of 0–9 and inputting a secret number is set.

The area 72 also serves as an area for inputting a fingerprint. At the following step a22, the central processing unit 32 judges whether control of inputting a secret number by touching the secret number input area 72 of the screen 71 with a finger has been done or not. When the unit judges that control of inputting a secret number by touching the area 72 with a finger has been done, the operation goes to the following step a23. At this moment, as well as a secret number, a fingerprint is inputted. In a case where a finger touches an area other than the area 72, it will be ignored.

At step a23, the fingerprint data sensing control unit 33 reads out fingerprint data and coordinate data at a position touched with a finger from the display/fingerprint reading unit 34 and temporarily stores the data in the storage section 58. At the following step a24, based on a position according to the acquired coordinate data, a secret number is detected and acquired. At the following step a25, the acquired fingerprint data are stored in the storage unit 40. At the following step a26, it is judged whether or not a secret number has been inputted up to a preset number of digits, for example, four digits. The operation goes to step a27 when inputted, whereas the operation goes back to step a22 when not inputted.

At step a27, the central processing unit 32 verifies the acquired secret number against a previously registered secret number to identify the number and judges whether both the numbers match or not. The operation goes to step a28 when match, whereas the operation goes to step 29 when not match. At step a28, where the secret numbers match, the central processing unit 32 verifies against the acquired fingerprint data with previously stored fingerprint data to identify the data and judges whether both the data match or not. The operation is ended in the present state when both the data match, whereas the operation goes to step a30 when not match. At steps a29 and a30, error display is performed and the operation is ended.

A secret number verification program, as well as the fingerprint verification program, is read out from the storage unit 38 and stored into the storage unit 40. This program does not need to be read out and stored for every verification of a secret number, and the program having been read out and stored at the beginning may be used repeatedly. Further, error display at steps a29 and a30 can be performed as required, and the operation may be ended soon after the operations at steps a27 and a28 are ended.

Figure 8:
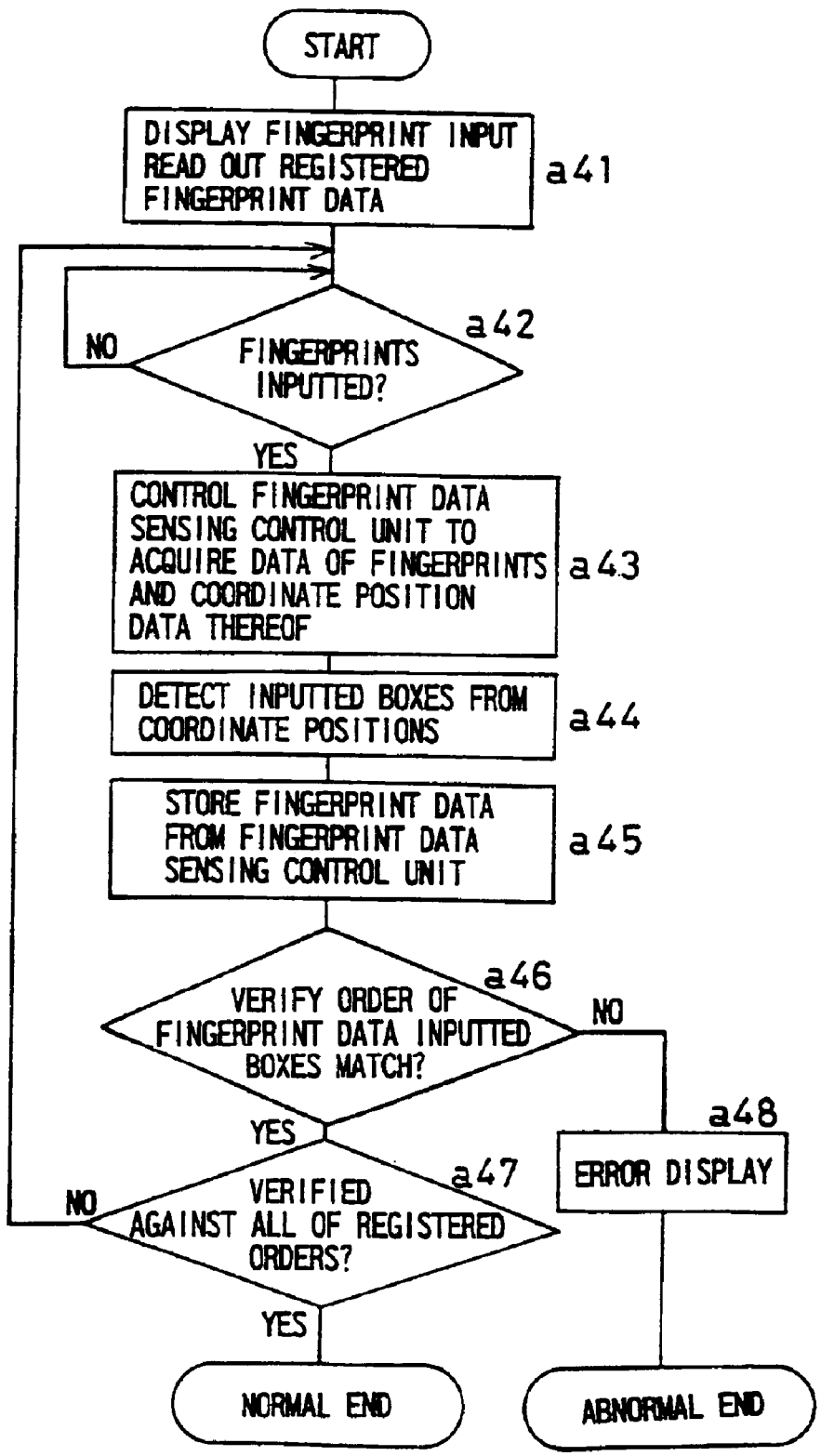
FIG. 8 is a flow chart showing a fourth operation of the information processing apparatus 31.
Figure 9:
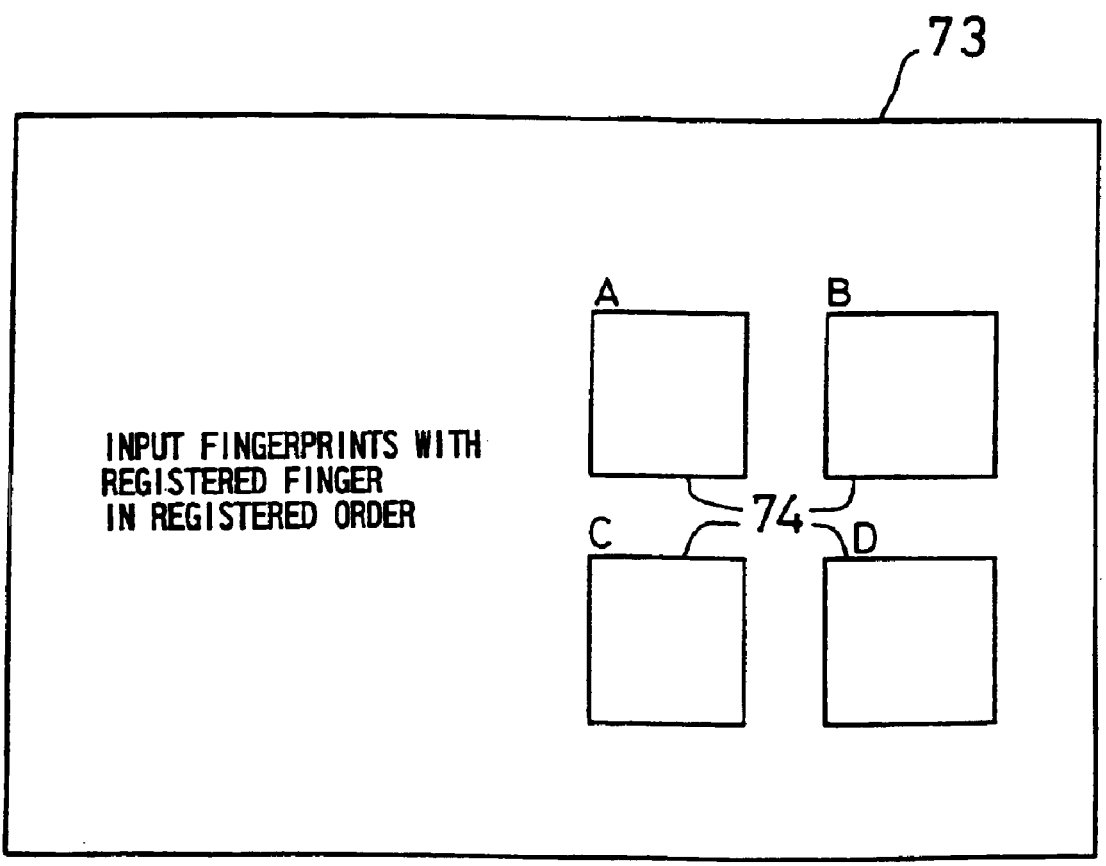
FIG. 9 is a view showing a screen 73, which encourages input of a fingerprint.

FIG. 8 is a flow chart showing a fourth operation of the information processing apparatus. At step a41, such a screen 73 encouraging input of fingerprints as shown in FIG. 9 is set and displayed on the display/data reading screen 59 of the display/fingerprint reading unit 34. On the screen 73, a plurality of fingerprint input boxes 74 are set. Further, fingerprint data stored in the storage unit 38 are read out and stored in the storage unit 40.

At the following step a42, the central processing unit 32 judges whether control of inputting fingerprints by touching inside the fingerprint input boxes 74 of the screen 73 with a finger has been done or not. When the unit judges that control of inputting fingerprints by touching inside the boxes 74 with a finger has been done, the operation goes to the following step a43. Here, if a finger touches outside the boxes 74, it will be ignored.

At step a43, the fingerprint data sensing control unit 33 reads out fingerprint data and coordinated data of positions touched with a finger from the display/fingerprint reading unit 34 and temporarily stores the data in the storage section 58. At the following step a44, based on the positions according to the acquired coordinate data, the boxes 74 with fingerprints inputted are detected and acquired. At the following step a45, the acquired fingerprint data are stored into the storage unit 40. At the following step a46, the order of inputting fingerprints into the boxes is verified against the previously registered order of boxes to judge whether both the orders match or not. When matching, the operation goes to step a47, whereas when not matching the operation goes to step a48.

At step a47, the central processing unit 32 judges whether or not the box order has been verified against all the previously stored box orders. When the box order has been verified against all the box orders to identify, the operation is ended, and in the case where the box order has not been verified against all the box orders, goes back to step a42. At step a48, error display is performed and the operation is ended.

An verification program of the box order, as well as the fingerprint verification program, is read out from the storage unit 38 and stored into the storage unit 40. This program does not need to be read out and stored at every verification of the order of boxes, and the program having been read out and stored at the beginning may be used repeatedly. Further, error display at step a48 can be performed as required, and the operation may be ended at once when the box orders do not match at step a46.

Figure 10:
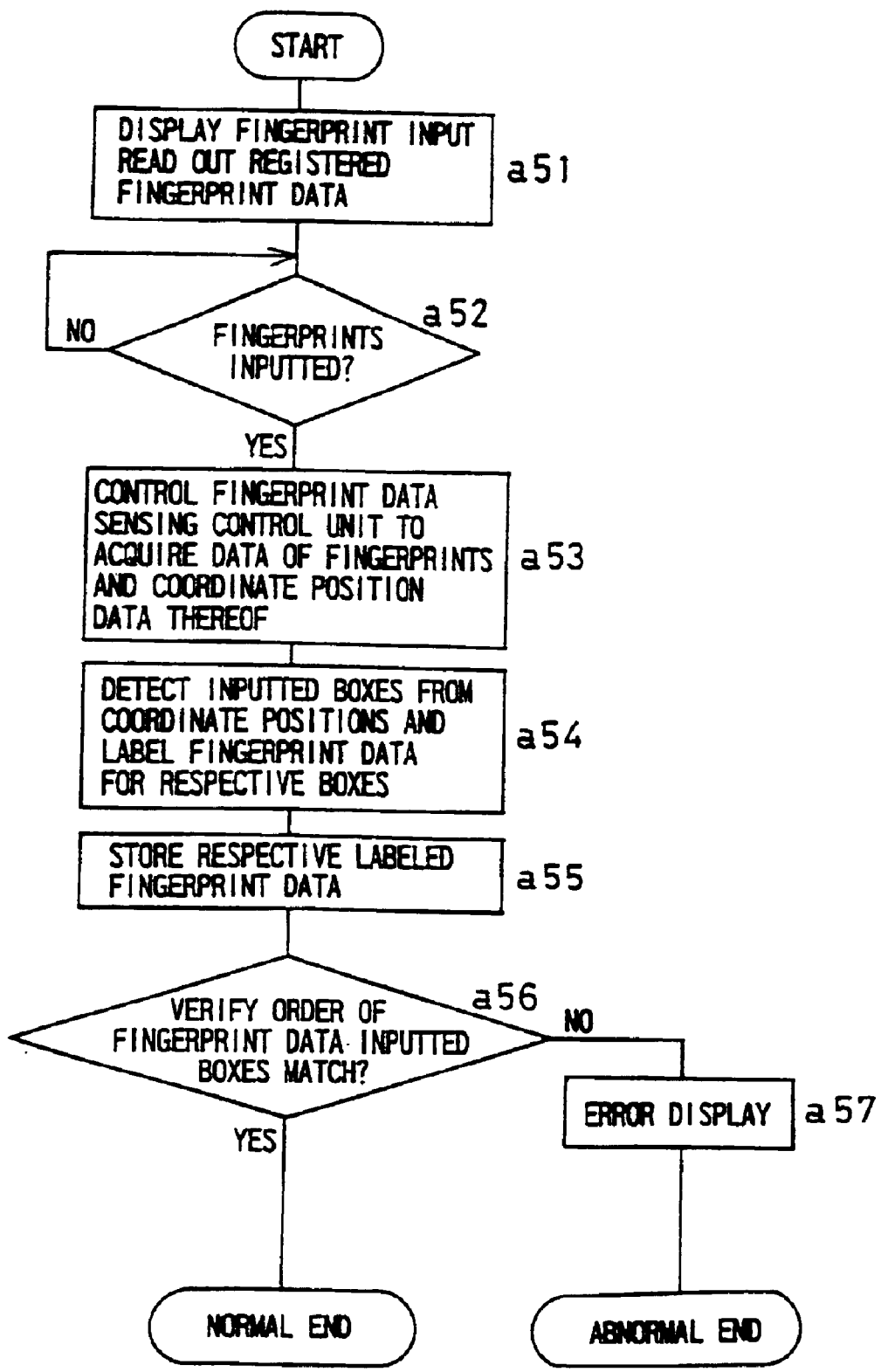
FIG. 10 is a flow chart showing a fifth operation of the information processing apparatus 31.
Figure 11:
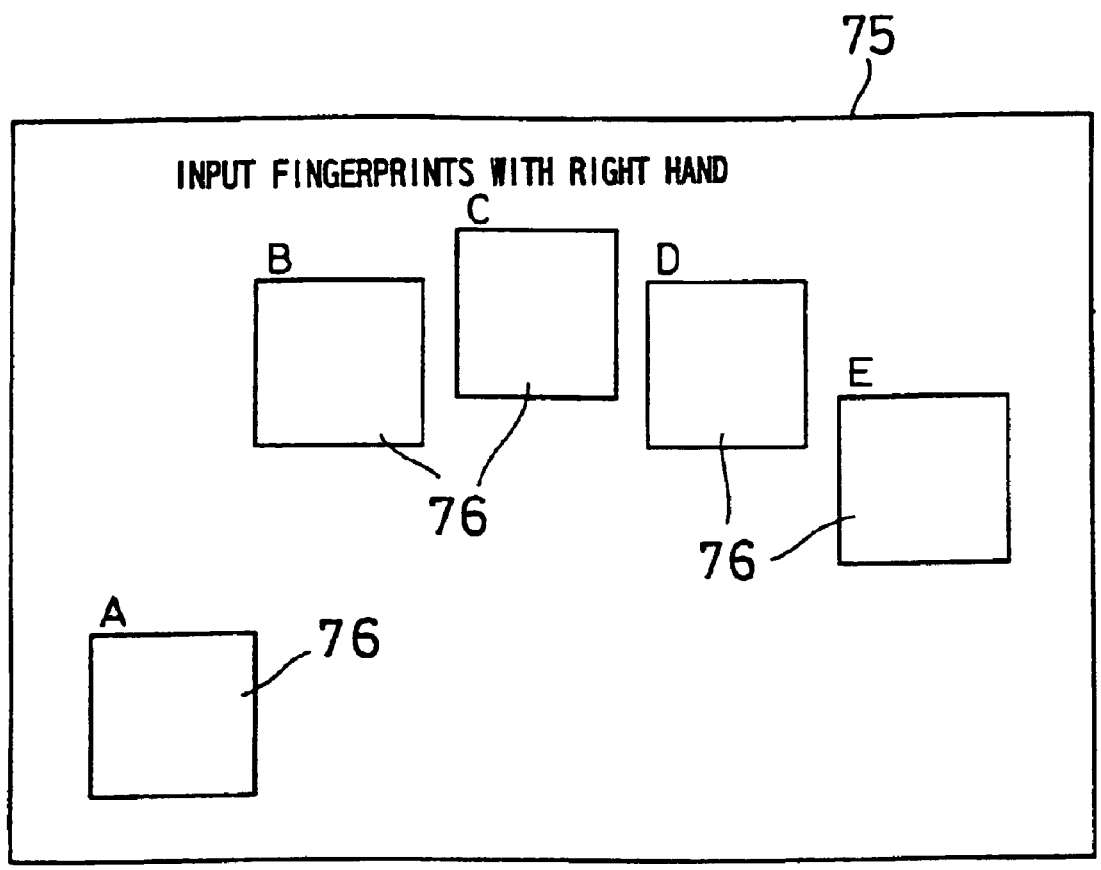
FIG. 11 is a view showing a screen 75, which encourages input of a fingerprint.

FIG. 10 is a flow chart showing a fifth operation of the information processing apparatus 31. At step a51, such a screen 75 encouraging input of fingerprints as shown in FIG. 11 is set and displayed on the display/data reading screen 59 of the display/fingerprint reading unit 34. On the screen 75, fingerprint input boxes 76 for the respective fingers are set. Further, fingerprint data stored in the storage unit 38 are read out and stored into the storage unit 40.

At the following step a52, the central processing unit 32 judges whether control of inputting fingerprints by touching inside the fingerprint input boxes 76 of the screen 75 with fingers has been done or not. When the unit judges that control of inputting fingerprints has been done by touching inside the boxes 76 with fingers, the operation goes to the following step a53. Here, if a finger touches outside the boxes 76, it will be ignored.

At step a53, the fingerprint data sensing control unit 33 reads out fingerprint data and coordinate data of positions touched with fingers from the display/fingerprint reading unit 34 and temporarily stores the data in the storage section 58. At the following step a54, based on the positions according to the acquired coordinate data, the boxes 76 with fingerprints inputted are detected and acquired to label the fingerprint data for the respective fingers. At step a55, the respective fingerprint data having been acquired and labeled are stored into the storage unit 40.

At the following step a56, the respective fingerprint data having been labeled is verified against previously registered fingerprint data to identify, and it is judged whether the data matches or not. Moreover, the order of inputting fingerprints into the boxes is verified against the previously registered box order, and it is judged whether both the orders match or not. At this moment, both or either of fingerprint verification and box order verification may be carried out. The operation is ended in the present state when fingerprints and/or the box orders match, whereas the operation goes to step a57 when not match, where error display is performed and the operation is ended.

Error display at step a57 may be performed as required, and the operation may be ended at once when fingerprints and/or the box orders do not match at step a56.

Figure 12:
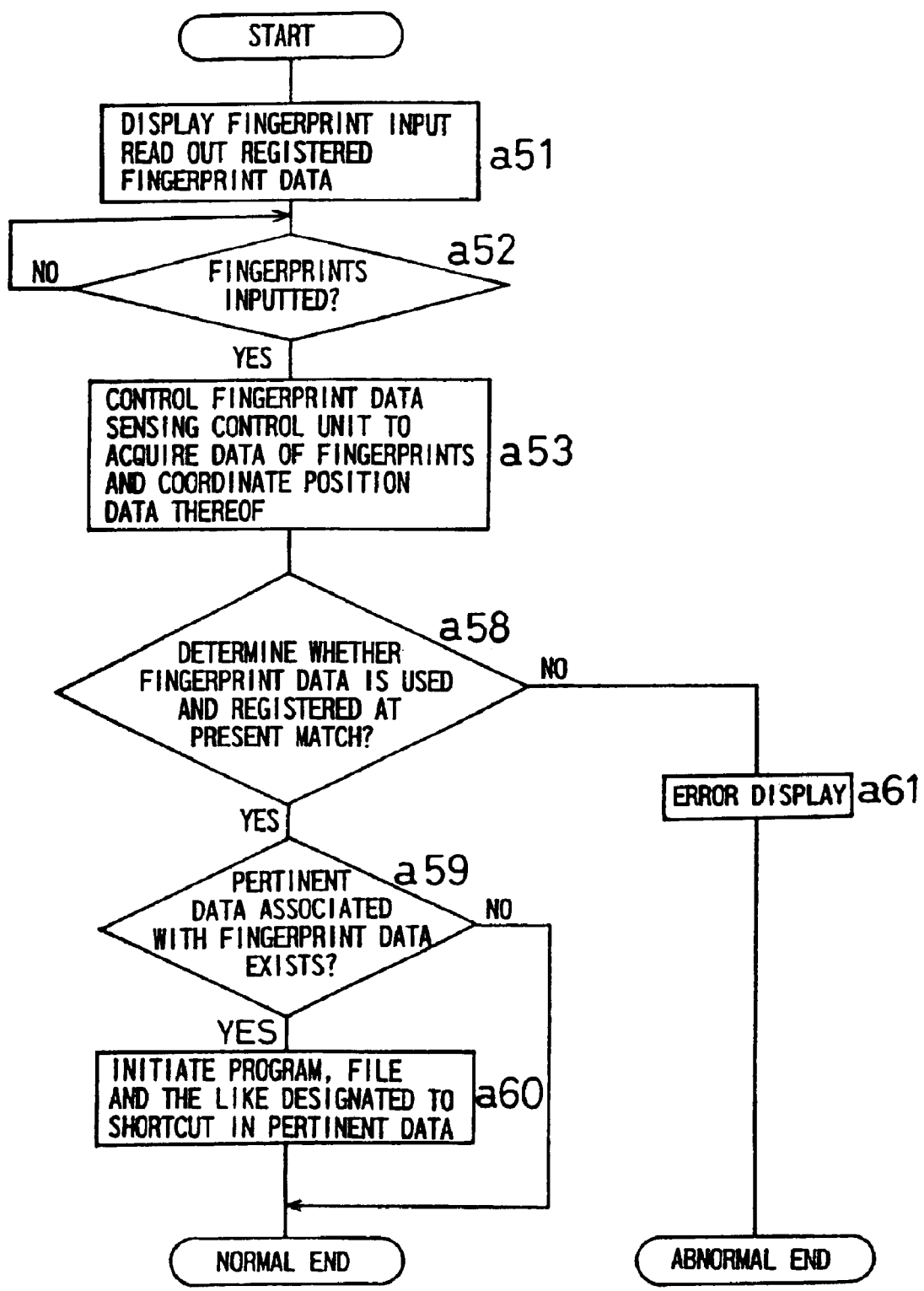
FIG. 12 is a flow chart showing a sixth operation of the information processing apparatus 31.

FIG. 12 is a flow chart showing a sixth operation of the information processing apparatus 31. This flow chart is the one that steps a54 to a57 in the flow chart of FIG. 10 are deleted and steps a58 to a61 are added, so that explanation of like steps will be omitted. At step a53, the fingerprint data sensing control unit 33 reads out fingerprint data and coordinate data of positions touched with fingers from the display/fingerprint reading unit 34, temporarily stores the data in the storage section 58 and transfers the data to the storage unit 40. At the following step a58, the unit verifies the fingerprint data against registered data, and judges whether both the data match or not. The operation goes to step a59 when match, whereas the operation goes to step a61 when not match.

At step a59, it is judged whether pertinent data associated with the user having the matching fingerprint data are stored or not. When stored, the operation goes to step a60, where a command previously set for each finger according to the pertinent data is read out end executed, and the operation is ended. When the pertinent data are not stored, the operation is ended in the present state. At step a61, error display is performed and the operation is ended.

Error display at step a61 may be performed as required, and the operation may be ended at once when fingerprint data do not match at step a58.

Figure 13:
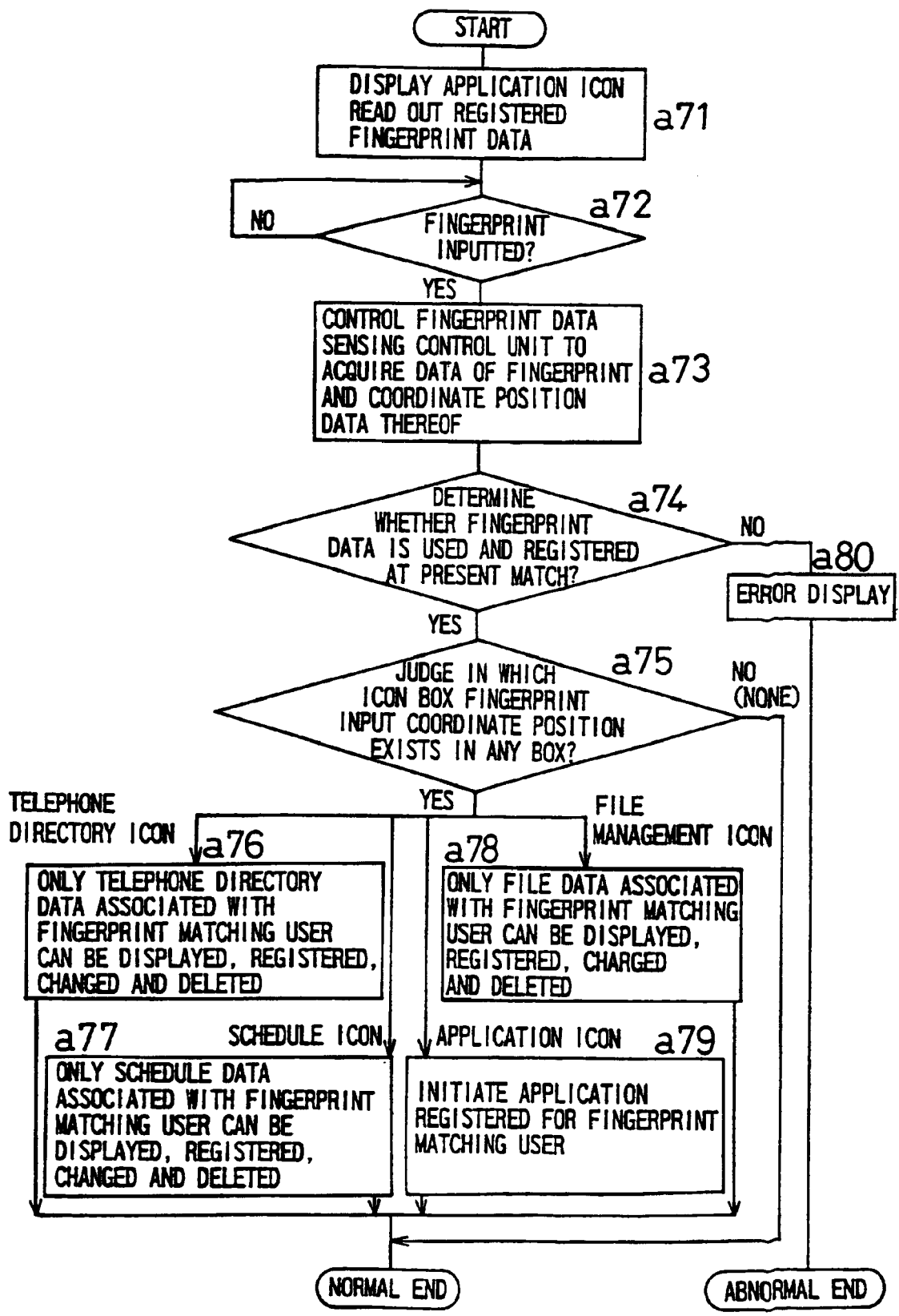
FIG. 13 is a flow chart showing a seventh operation of the information processing apparatus 31.
Figure 14:
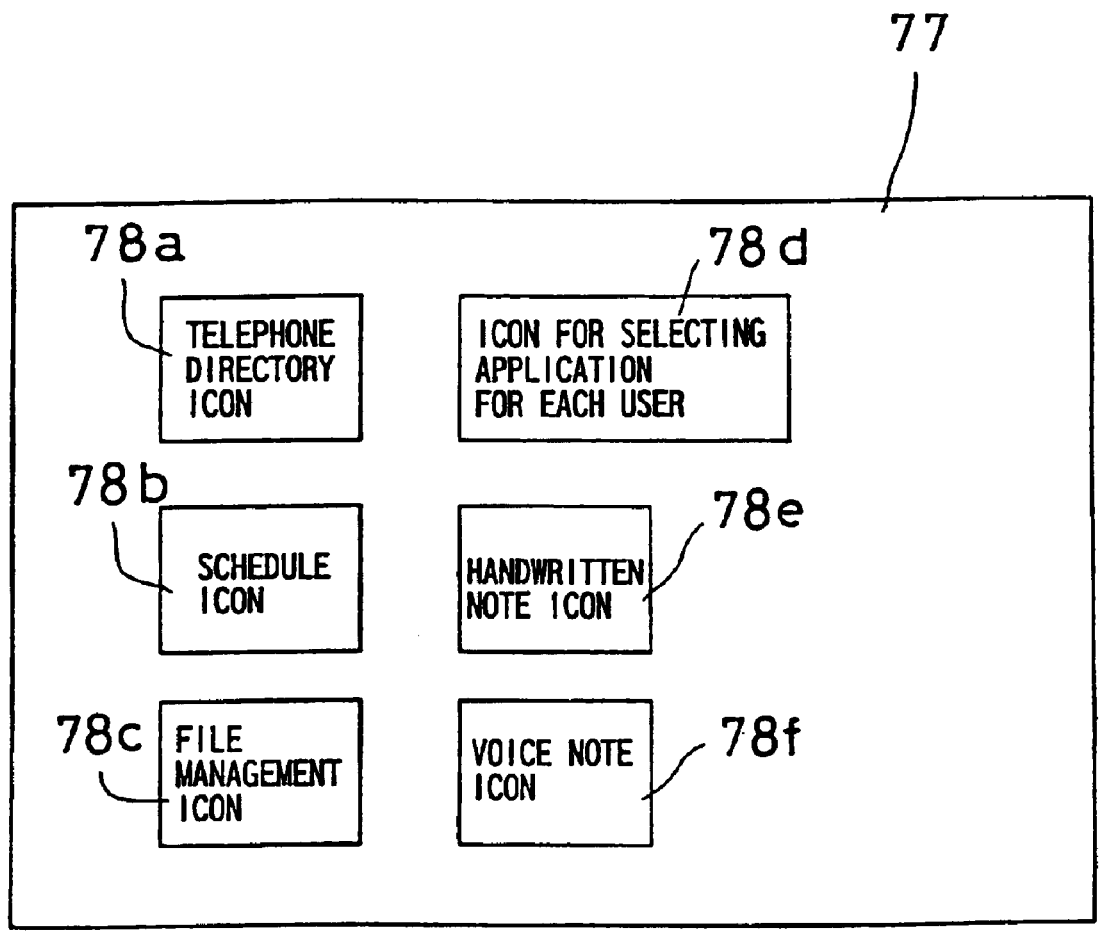
FIG. 14 is a view showing a screen 77, which encourages designation of an icon.

FIG. 13 is a flow chart showing a seventh operation of the information processing apparatus 31. At step a71, such a screen 77 encouraging designation of an icon as shown in FIG. 14 is set and displayed on the display/data reading screen 59 of the display/fingerprint reading unit 34. On the screen 77, a plurality of icons 78a to 78f are set. The areas of the icons 78a to 78f also serve as the areas for fingerprint input. Further, fingerprint data stored in the storage unit 38 are read out and stored into the storage unit 40.

At the following step a72, the central processing unit 32 judges whether control of inputting a fingerprint by touching the screen 77 with a finger has been done or not. When the unit judges that control of inputting a fingerprint by touching with a finger has been done, the operation goes to the following step a73. Here, the operation can be controlled so as not to go to the following step when a finger touches outside the icons 78a to 78f.

At the following step a73, the fingerprint data sensing control unit 33 reads out fingerprint data and coordinate data of a position touched with a finger from the display/fingerprint reading unit 34, temporarily stores the data in the storage section 58 and transfers the data to the storage unit 40. At the following step a74, the fingerprint data is compared to judge whether the fingerprint data matches or not. The operation goes to step a75 when match, whereas the operation goes to step a80 when not match, where error display is performed and the operation is ended.

At step a75, it is judged in which icon of the icons 78a to 78f the fingerprint has been inputted. The operation goes to step a76 in the case of the telephone directory icon 78a, goes to step a77 in the case of the schedule icon 78b, goes to step a78 in the case of the file management icon 78c and goes to step a79 in the case of the application icon 78d. Although not shown in this flow chart, an application for handwritten notes is initiated in the case of the icon 78e, while an application for voice notes is initiated in the case of the icon 78f, and then the operation is ended. When a finger has touched outside the icons 78a to 78f, the operation is ended in the present state. At steps a76 to a78, only data of the user having the matching fingerprint in an application corresponding to each of the icons 78a to 78c having been designated is read out and displayed to enable the user to perform data edition such as registration, change and deletion, and then the operation is ended. Further, at step a79, from among applications previously registered for each user, an application associated with the user having the matching fingerprint is initiated, and the operation is ended.

Error display at step a80 can be performed as required, and the operation may be ended at once when fingerprint data do not match at step a74.

Figure 15:
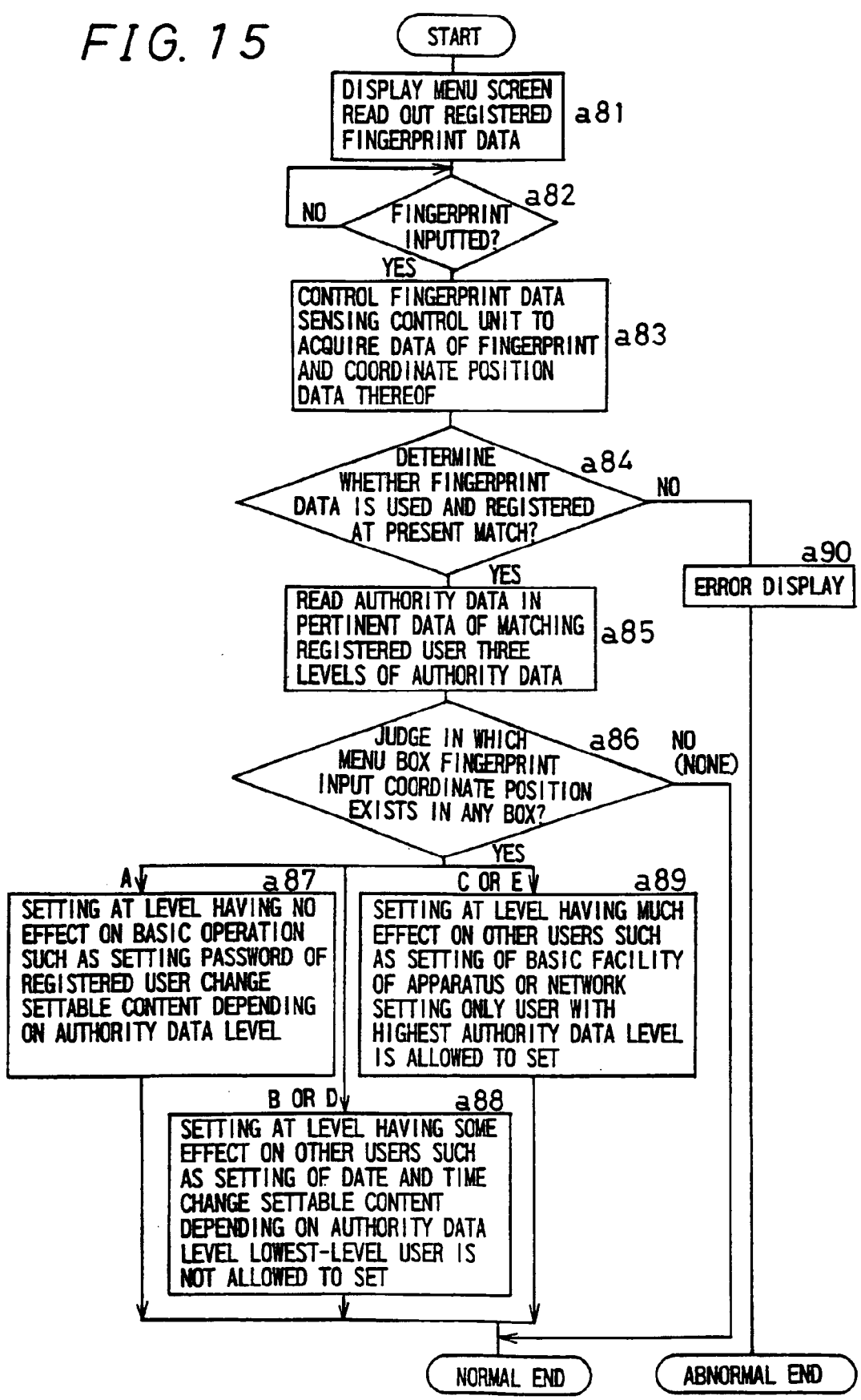
FIG. 15 is a flow chart showing an eighth operation of the information processing apparatus 31.
Figure 16:
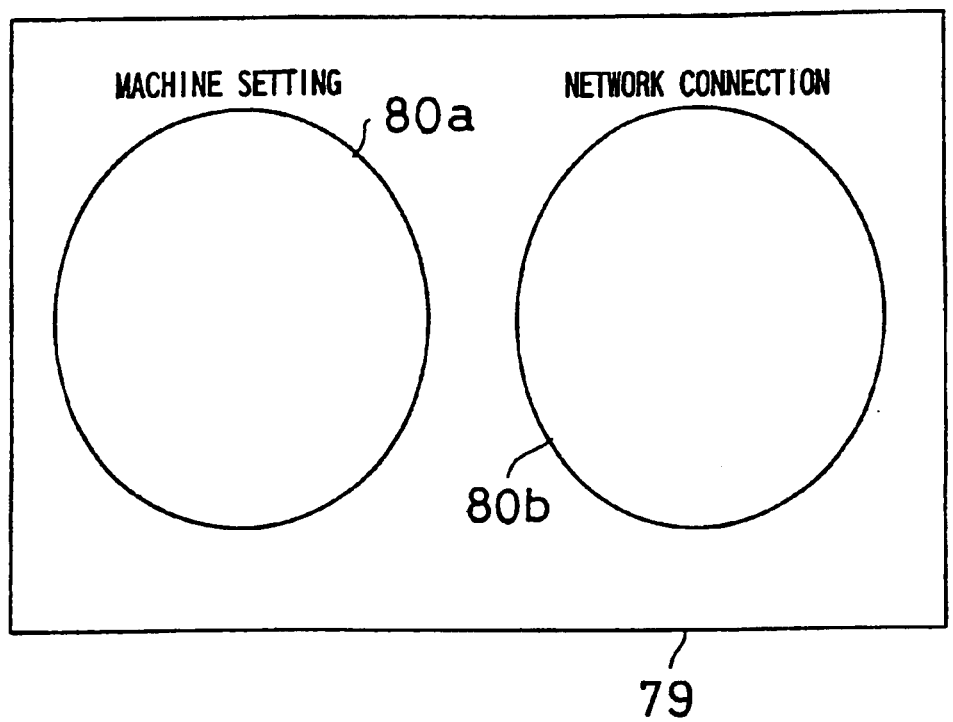
FIG. 16 is a view showing a screen 79, which encourages designation of a menu.

FIG. 15 is a flow chart showing an eighth operation of the information processing apparatus 31. At step a81, such a screen 79 encouraging designation of a menu as shown in FIG. 16 is set and displayed on the display/data reading screen 59 of the display/fingerprint reading unit 34. There are two menus of machine set and network connection, and two menu designation areas 80a and 80b are set on the screen 79. The menu designation areas 80a and 80b also serve as areas for inputting fingerprints. Further, fingerprint data stored in the storage unit 38 are read out and stored into the storage unit 40.

Figure 17:
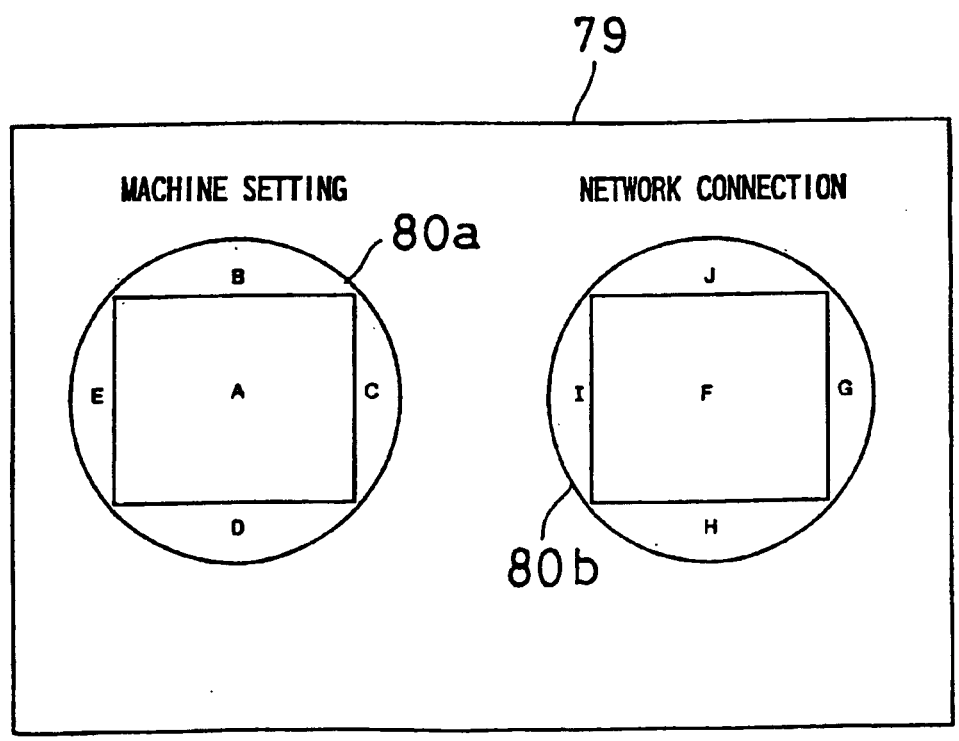
FIG. 17 is a view showing a plurality of areas A to J of menu designation areas 80a and 80b of the screen 79.

The menu designation areas 80a and 80b of the screen 79 encouraging menu designation are, to be more specific, divided into a plurality of areas A to J as shown in FIG. 17. Depending on an area into which a fingerprint has been inputted among the areas A to J in the areas 80a and 80b, an authority level at the time of executing a menu is specified.

At the following step a82, the central processing unit 32 judges whether control of inputting a fingerprint by touching the screen 79 with a finger has been done or not. When the unit judges that control of inputting a fingerprint by touching with a finger has been done, the operation goes to the following step a83. Here, the operation can be controlled so as not to go to the following step when a finger touches outside the menu designation areas 80a and 80b.

At step a83, the fingerprint data sensing control unit 33 reads out fingerprint data and coordinate data of a position touched with a finger from the display/fingerprint reading unit 34, temporarily stores the data in the storage section 58 and transfers the data to the storage unit 40. At the following step a84, the fingerprint data is compared to judge whether the data matches or not. The operation goes to step a85 when matching, whereas the operation goes to step a90 when not matching, where error display is performed and the operation is ended.

At step a85, authority data associated with the user having the matching fingerprint are read out from the storage unit 38 and stored into the storage unit 40. At the following step a86, it is judged into which area of the areas A to E a fingerprint has been inputted. The operation goes to step a87 in the case of the area A, goes to step a88 in the case of the area B or D and goes to step a89 in the case of the area C or E. The operation is ended so that the menu of machine set is executed at the level of the authority data having been read out and stored, as well as the authority level specified by the respective areas A to E. In other cases, the operation is ended in the present state.

Error display at step a90 can be performed as required, and the operation may be ended at once when the fingerprint data do not match at step a84.

Figure 18:
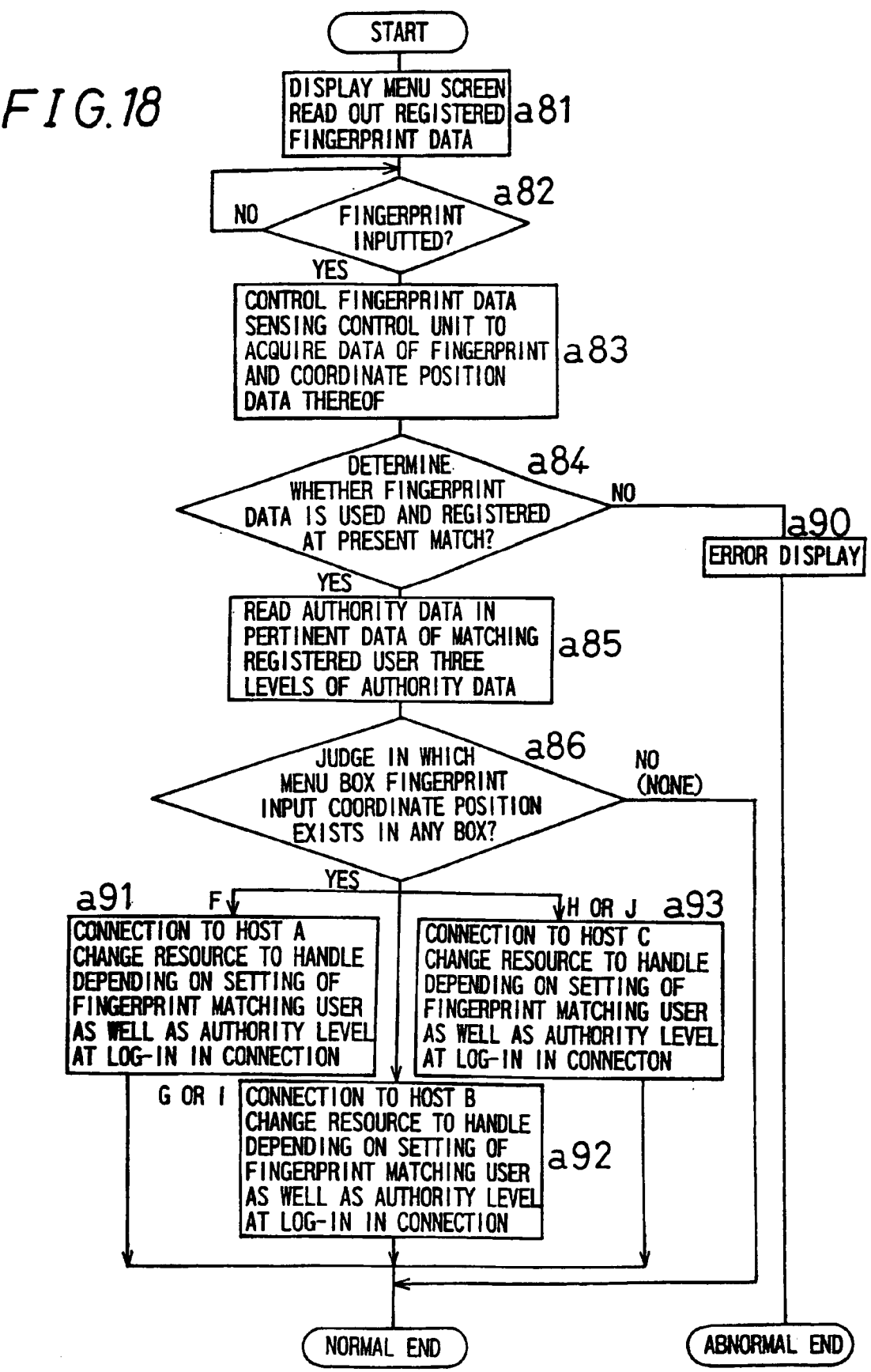
FIG. 18 is a flow chart showing a ninth operation of the information processing apparatus 31.

FIG. 18 is a flow chart showing a ninth operation of the information processing apparatus 31. This flow chart is the one that steps a87–a89 in the flow chart of FIG. 15 are deleted and steps a91–a93 are added, so that explanation of like steps will be omitted. At step a86, it is judged in which area of the areas F to J a fingerprint has been inputted. The operation goes to step a91 in the case of the area F, goes to step a92 in the case of the area G or I and goes to step a93 in the case of the area H or J. The operation is ended so that the menu of network connection is executed at the level of authority data having been read out and stored, as well as the authority level specified by the respective areas F to J. In other cases, the operation is ended in the present state.

Figure 19:
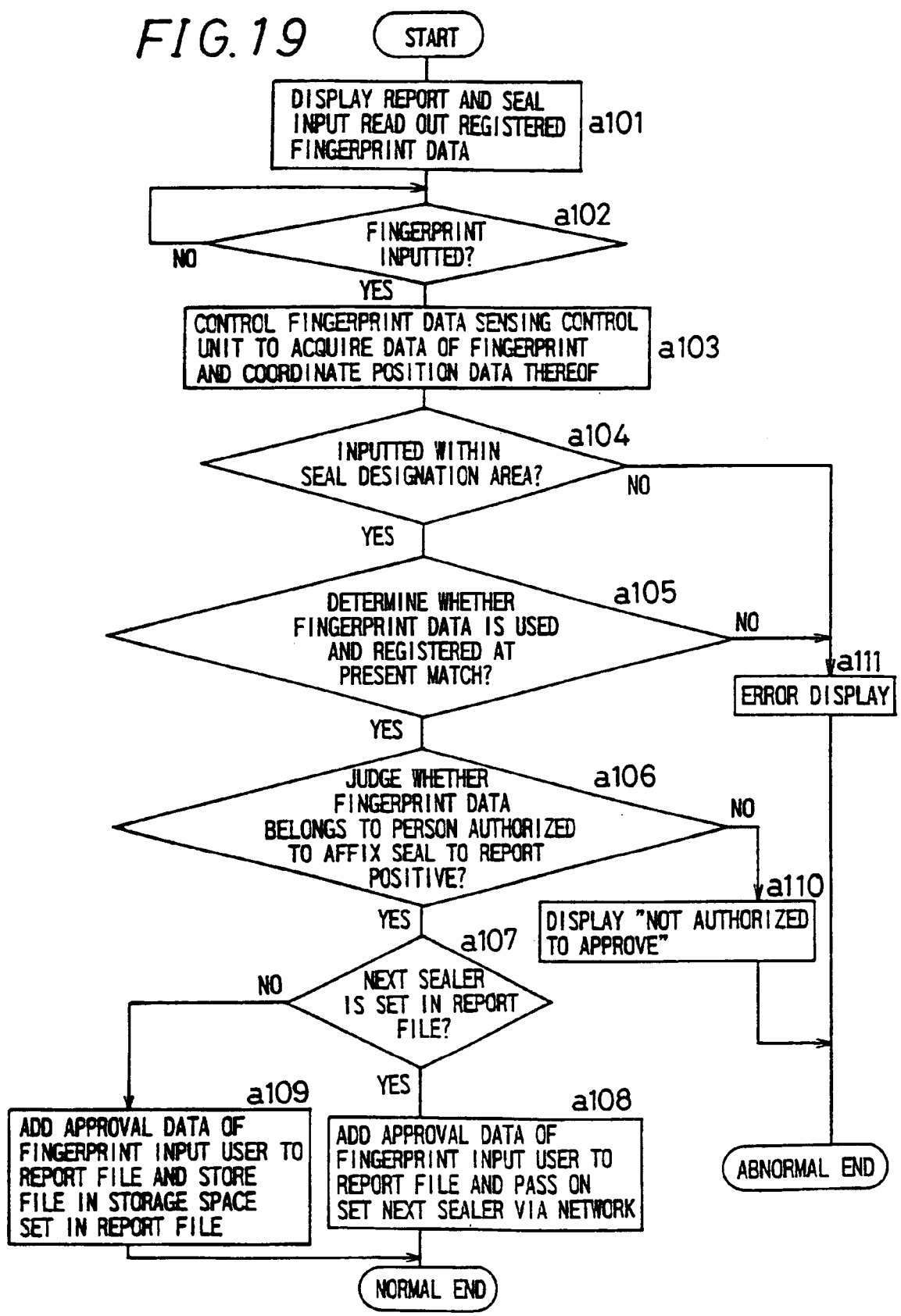
FIG. 19 is a flow chart showing a tenth operation of the information processing apparatus 31.

FIG. 19 is a flow chart showing a tenth operation of the information processing apparatus 31. At step a101, such a screen 81 including a report 83 as shown in FIG. 20 is set and displayed on the display/data reading screen 59 of the display/fingerprint reading unit 34. In the report 83, seal boxes 82 are set. Here, the seal boxes 82 also serve as areas for inputting fingerprints. Further, fingerprint data stored in the storage unit 38 are read out and stored in the storage unit 40.

At the following step a102, the central processing unit 32 judges whether control of inputting a fingerprint by touching the report 83 with a finger has been done or not. When the unit judges that control of inputting a fingerprint by touching the report 83 with a finger has been done, the operation goes to the following step a103. At this moment, a finger may touch the overall screen 81.

At step a103, the fingerprint data sensing control unit 33 reads out fingerprint data and coordinate data of a position touched with a finger from the display/fingerprint reading unit 34, temporarily stores the data in the storage section 58 and transfers the data to the storage unit 40. At the following step a104, it is judged whether or not a fingerprint has been inputted into one of the seal boxes 82. The operation goes to step a105 when inputted into one of the seal boxes 82, whereas in other cases, the operation goes to step a111, where error display is performed, and the operation is ended.

At step a 105, fingerprint data is compared to judge whether the data matches or not. The operation goes to step a106 when match, whereas the operation goes to step a111 when not match, where error display is performed, and the operation is ended.

At step a106, based on pertinent data, it is judged whether or not the matching fingerprint data belong to a person authorized to affix his/her seal to the report. The operation goes to step a107 when the judgement result is positive, whereas the operation goes to step a110 when negative, where display showing that the user is not authorized to approve is performed, and the operation is ended.

At step a107, it is judged whether or not the next sealer is set on the report. The operation goes to step a108 when set, whereas the operation goes to step a109 when not set. At step a108, the user having inputted a fingerprint affixes his/her approval seal to the report and passes the report with the approval seal affixed on the next sealer. That is to say, data transmission to the next sealer is performed via network. Then, the operation is ended. At step a109, the user having inputted a fingerprint affixes his/her approval seal to the report and stores the report with the approval seal affixed into a storage space set in the report file, whereby the operation is ended.

Display at step a110 and error display at step a111 can be performed as required, and the operation may be ended at once when fingerprint data do not match at step a105 and when a judgment at step a106 is negative.

Figure 21:
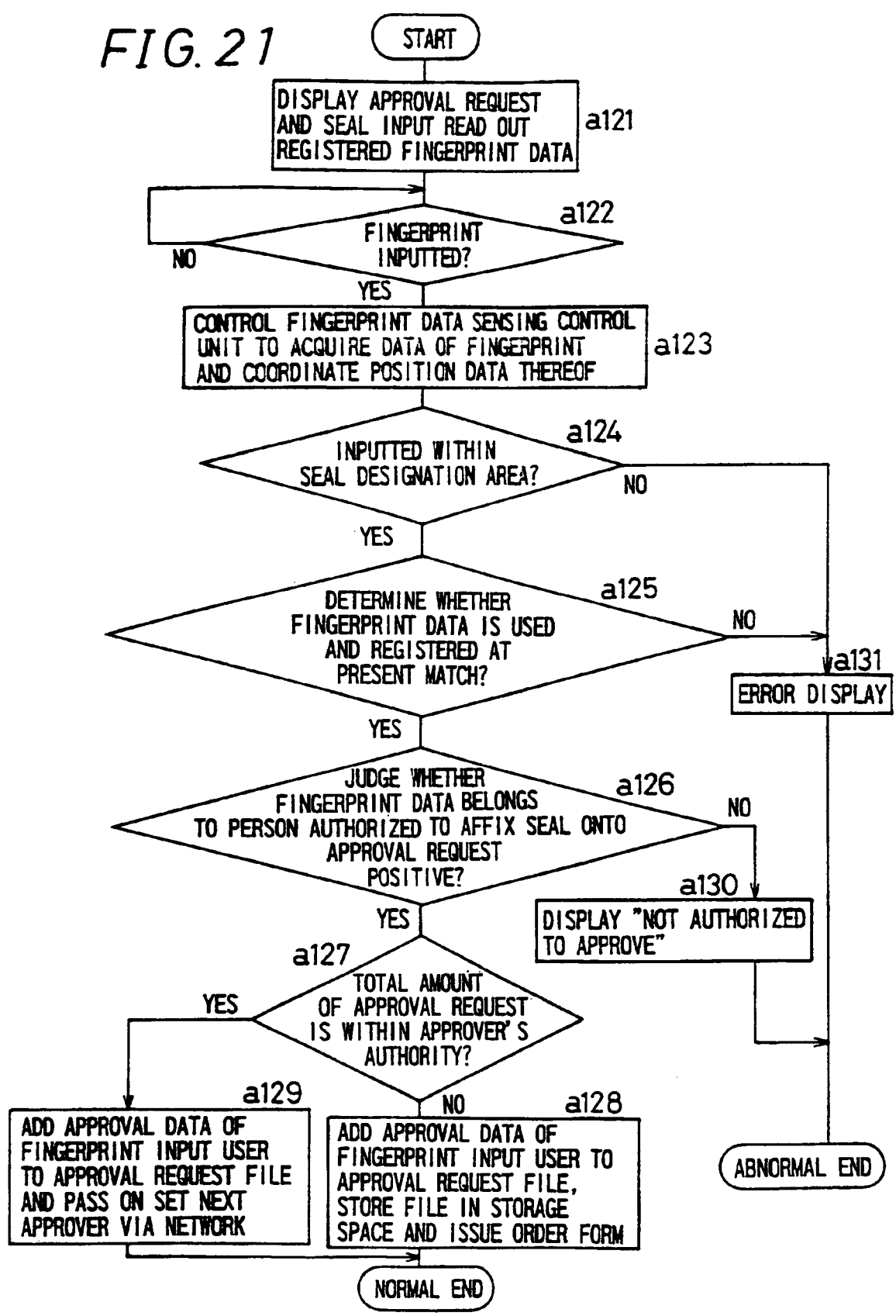
FIG. 21 is a flow chart showing an eleventh operation of the information processing apparatus 31.
Figure 24:
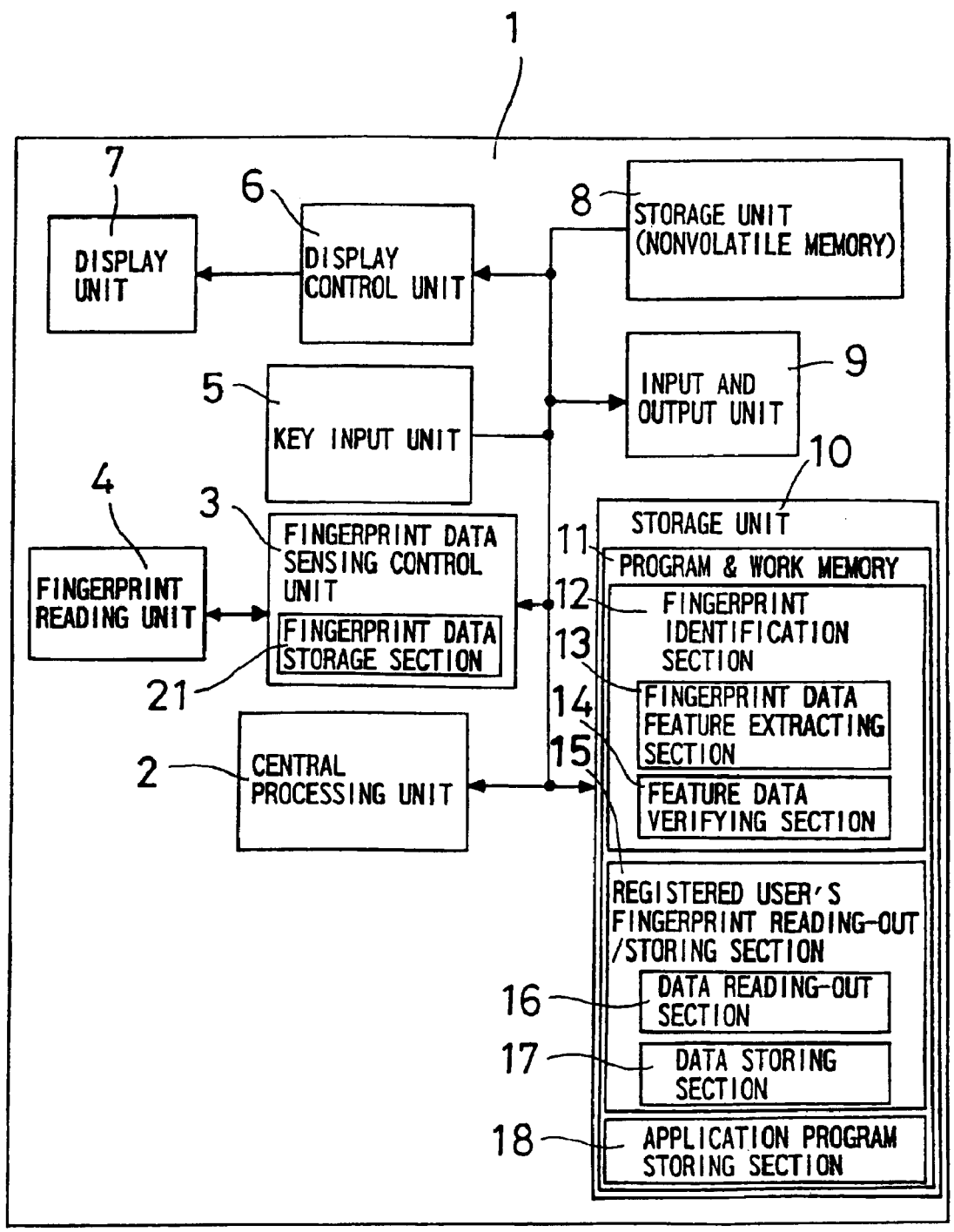
FIG. 24 is a block diagram of a prior art information processing apparatus 1.
Figure 25A:
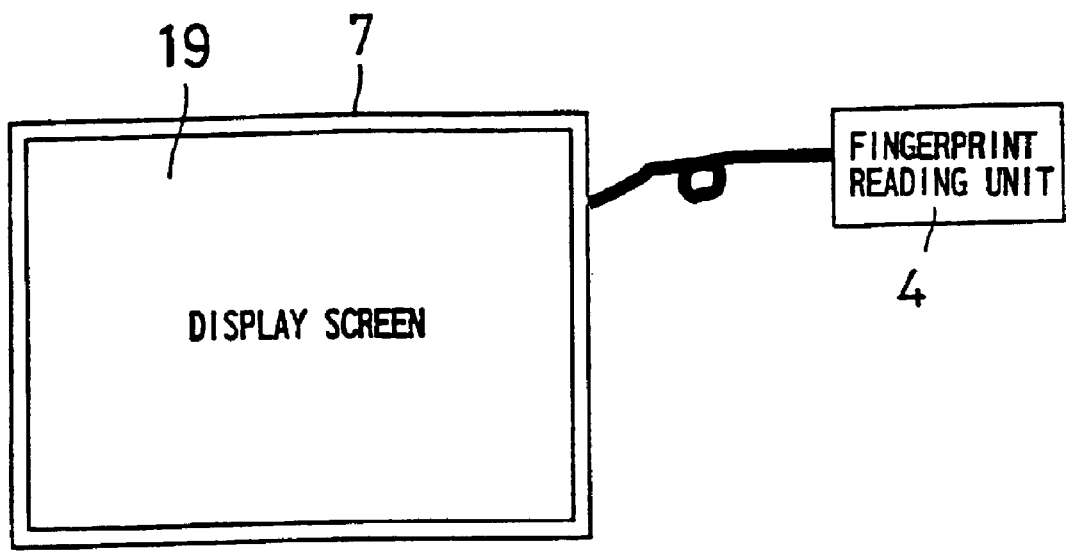
FIGS. 25A and 25B are views showing a fingerprint reading unit 4 and a display unit 7 comprised by the information processing apparatus 1.
Figure 25B:
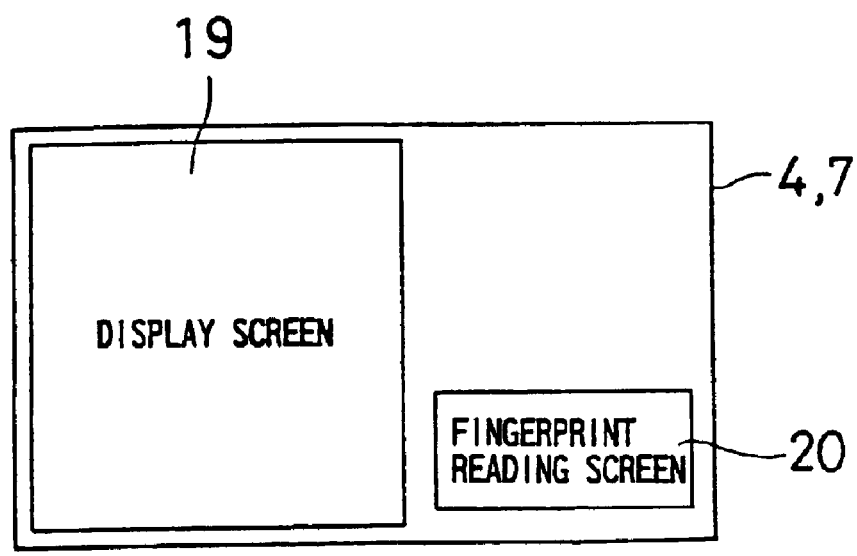

FIG. 21 is a flow chart showing an eleventh operation of the information processing apparatus 31. At step a121, such a screen 84 including a approval request 86 as shown in FIG. 22 is set and displayed on the display/data reading screen 59 of the display/fingerprint reading unit 34. In the approval request 86, seal boxes 85 are set. Here, the seal boxes 85 also serve as areas for inputting fingerprints. Further, fingerprint data stored in the storage unit 38 are read out and stored in the storage unit 40.

At the following step a122, the central processing unit 32 judges whether control of inputting a fingerprint by touching the approval request 86 with a finger has been done or not. When the unit judges that control of inputting a fingerprint by touching the approval request 86 with a finger has been done, the operation goes to step a123. At this moment, a finger may touch the overall screen 84.

At step a123, the fingerprint data sensing control unit 33 reads out fingerprint data and coordinate data of a position touched with a finger from the display/fingerprint reading unit 34, temporarily stores the data in the storage section 58 and transfers the data to the storage unit 40. At the following step a124, it is judged whether or not a fingerprint has been inputted into one of the seal boxes 85. The operation goes to step a125 when inputted into one of the seal boxes 85, whereas in other cases, the operation goes to step a131, where error display is performed, and the operation is ended.

At step a125, fingerprint data is compared to judge whether the data match or not. The operation goes to step a126 when match, whereas the operation goes to step a131 when not match, where error display is performed, and the operation is ended.

At step a126, based on pertinent data, it is judged whether or not the matching fingerprint data belong to a person authorized to affix his/her seal to the approval request. The operation goes to step a127 when the judgement result is positive, whereas the operation goes to step a130 when negative, where display showing that the user is not authorized to approve is performed, and the operation is ended.

At step a127, it is judged whether or not the total amount of the approval request is within the authority of the approver. The operation goes to step a129 when the amount is within the authority, whereas the operation goes to step a128 when not within the authority. At step a129, the user having inputted a fingerprint affixes his/her approval seal to the approval request and passes the approval request with the approval seal affixed on the next approver. That is to say, data transmission to the next approver is performed via network. Then, the operation is ended. At step a128, the user having inputted a fingerprint affixes his/her approval seal to the approval request, stores the approval request with the approval seal affixed into a storage place set in the approval request file and performs an order form issuing process, whereby the operation is ended.

Display at step a130 and error display at step a131 can be performed as required, and the operation may be ended at once when fingerprint data do not match at step a125 and the judgement at step a126 is negative.

FIG. 23 is a block diagram of an information processing apparatus 57, which is another embodiment of the invention. The information processing apparatus 57, which is constructed in almost the same manner as the information processing apparatus 31, further comprises a mouse 52 as coordinate designating means, wherein the mouse 52 is provided with a reading surface 50 of a fingerprint reading unit. Like elements as in the apparatus 31 will be denoted by like reference numerals.

To the central processing unit 32 of the information processing apparatus 57 provided with a fingerprint verification function, the fingerprint data sensing control unit 49 which controls a fingerprint reading operation, the display control unit 36 which controls a display operation of the display unit 51, a pointer control unit 55 which controls the operation of the mouse 52, a fingerprint reading position detecting unit 56 which detects a coordinate position related to fingerprint reading on the display surface designated by the mouse, the key input unit 37, the storage unit 38, the input and output unit 39, and the storage unit 40 are connected, whereby the operation of the overall apparatus is integrally controlled.

The display unit 51 is implemented by, for example, a liquid crystal display device, and provided with a display surface with orthogonal coordinates set thereon. The fingerprint reading unit is implemented by, for example, a well-known technique, and provided with the fingerprint reading surface 50 touched with a finger. The fingerprint reading surface 50 is formed on the surface of the mouse 52. For example, the fingerprint reading surface is formed on one of a left button 53 and a right button 54 included in the mouse 52, and in this case, on the left button 53. The central processing unit 32 controls the operation of the information processing apparatus in a like manner as in the information processing apparatus 31 based on coordinate data detected and acquired by the fingerprint reading position detecting unit 56, and controls the operation of the apparatus 57 in a like manner as in the apparatus 31 based on the acquired fingerprint data.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An information processing apparatus comprising:
   fingerprint verification means for verifying a fingerprint read from a fingerprint reading surface against previously stored fingerprints of authorized users,
   the information processing apparatus further comprising:
   display means having a display surface with orthogonal coordinates set thereon;
   coordinate designating means for designating coordinates related to fingerprint reading on the display surface;
   secret number acquiring means for acquiring a secret number based on said designated coordinates, said acquiring occurs concurrently with said fingerprint reading on the display surface;
   secret number identifying means for verifying the acquired secret number against a previously stored secret number;
   control means for controlling an operation based on designated coordinates and a result of the secret number verification;
   menu execution level area setting means for setting an area associated with an execution level of a menu; and
   menu execution level area designation judging means for judging based on designated coordinates whether a set menu execution level area is designated or not, wherein when a menu execution level area is designated and there is a match in fingerprint, the control means executes a menu at an execution level associated with an authorized user having the matching fingerprint among execution levels previously set for the respective users, as well as an execution level of the designated menu execution level area.

* * * * *